United States Patent [19]
Stevens, III et al.

[11] Patent Number: 5,944,278
[45] Date of Patent: Aug. 31, 1999

[54] FLEXIBLE WEB CONVERTER WASTE REMOVAL APPARATUS AND CONTROL

[75] Inventors: William H. Stevens, III, Deltaville, Va.; Kenneth E. Rudolph, Jr., Louisville, Ky.; Edmond J. Cadieux, Jr., Mechanicsville, Va.; Jonathan Warren, Newnan, Ga.

[73] Assignee: Philip Morris Incorporated, New York, N.Y.

[21] Appl. No.: 08/951,593

[22] Filed: Oct. 16, 1997

[51] Int. Cl.⁶ .......................... B65H 35/00; B65H 35/08; B65H 35/04
[52] U.S. Cl. .................................. 242/525.4; 242/523.1; 242/526.1; 242/527.3; 242/532.3; 242/532.6; 242/534
[58] Field of Search .............................. 242/523.1, 525.4, 242/526.1, 527.3, 532.3, 532.6, 534, 538, 563

[56] References Cited

U.S. PATENT DOCUMENTS 5,762,283  6/1998  Buchmeyer et al. ................ 242/532.3

*Primary Examiner*—John Q. Nguyen
*Attorney, Agent, or Firm*—James T. Moore; Kevin B. Osborne; Charles E.B. Glenn

[57] ABSTRACT

A method and apparatus for reducing, capturing and disposing of the waste start up web of paper in high-speed manufacturing procedures which involve a converting step, e.g. laser perforation or the like. Specifically, the converting apparatus and the web speed are carefully and precisely controlled by a programmable logic controller to result in a rapid production of converted web with a minimum of waste. The apparatus and method are tuned by sampling the waste and web for conversion quality, and using that information to adjust the converting apparatus and bias that adjustment for maximum reduction in waste.

15 Claims, 16 Drawing Sheets

FLEXIBLE WEB CONVERTER WASTE REMOVAL APPARATUS AND CONTROL

BACKGROUND OF THE INVENTION

A. Field of the Invention

This invention relates to the field of flexible web handling and converting; especially the handling of webs supplied on long rolls known as bobbins. More specifically, this invention relates to a method and apparatus for reducing, capturing and disposing of the waste start up web of paper in high-speed manufacturing procedures which involve a converting step, e.g. laser perforation or the like.

B. Description of the Related Art

It is customary in the art, e.g. of cigarette manufacturing, to perform converting functions on lengthy rolls of paper provided in bobbins. Cigarettes use substantial amounts of paper in their production—as a wrapper, to enclose filter tow material as filters, and to tip filters onto columns of wrapped tobacco, to name a few exemplary uses.

Converting as used herein refers to a function such as perforation, either mechanically or by thermal energy transfer (e.g. focused laser energy or the like), printing, embossing, slitting, or other comparable functions on paper, films, or other flexible webs. For ease of illustration; however, a single embodiment will generally be referred to in the specification (laser perforation of paper), but one of skill in the art may easily see where this disclosure may have a wide range of applications. The protection afforded by this application should therefore be measured with reference to the appended claims and not the examples herein.

Each of the following cited patents are hereby incorporated in their entireties by reference. For ease of reference, they are broken up into topical sections. Kindly note that what follows is not meant to be an exhaustive description of the prior art, rather, a short description for assistance in understanding the prior art.

1. Conversion

Conversion of materials includes a variety of functions—printing, perforating, embossing, slitting, and the like.

U.S. Pat. No. 3,226,527 discloses the perforation of sheet materials by passing a laser beam over the sheet materials and interrupting the beam. Such an apparatus feeds the web from a roll as seen in FIG. 1 of that patent.

U.S. Pat. Nos. 3,965,327 and 4,049,945 disclose the cutting of a moving web of material by pivoting mirrors to trace and cut a predetermined pattern.

U.S. Pat. No. 4,118,619 (Re. 31,478) discloses a beam chopping device for converting a continuous beam into a series of scanning impulses with a series of annular rings which direct the beam onto a moving web of paper.

U.S. Pat. No. 4,121,595 discloses the perforation of wrapping paper by laser, monitoring the permeability of the wrapper, and adjusting the intensity of the laser in response to deviations from a desired value.

U.S. Pat. No. 4,265,254 discloses the perforation of smoking article wrappers on an advancing path by moving a reflector in conjunction with an energizer for the laser source to provide a plurality of holes from one source.

U.S. Pat. No. 4,302,654 discloses the perforation of cigarette tipping paper by placing a laser source inside of a cylindrical rotating roller mask having apertures and passing the paper over the surface of the mask.

A large number of other patents disclose various perforation means and apparatus, including U.S. Pat. No. 4,378,480 (beam chopping for web perforation); U.S. Pat. No. 4,404,452 (beam chopping with light reflective/transmission portions on rotatable assembly for web perforation); U.S. Pat. No. 4,404,454 (forming pulsed beams from a single beam); U.S. Pat. No. 4,410,785 (pair of laser beams derived from laser beam to provide perforation uniformity); U.S. Pat. No. 4,439,663 (forming matrix of beams from continuous focused laser beam); U.S. Pat. No. 4,916,272 (split laser beam reconverged); U.S. Pat. No. 4,767,909 (pulsed laser beam split; web perforated by focused beams); U.S. Pat. No. 5,060,668 (pulsed laser directed on bicomponent lens having two separate foci to perforate paper); U.S. Pat. No. 5,092,350 (laser directed by acousto-optical deflector and splitter to produce two parallel perforation tracks); U.S. Pat. Nos. 5,210,390 and 5,403,990(continuous convergent beam deflected by rotating polygon mirror, split by beam splitters, and refocused in a plurality of locations on traveling web) and U.S. Pat. No. 5,404,889 (movable focusing head focuses beam on traveling cigarette wrapper).

2. Web Transport

It is known to wrap bundles and packages of items using material fed from rolls, either as a part of external packaging, or a part of the product itself. U.S. Pat. No. 3,589,100 discloses an apparatus which provides a first and second web of heat sealable material, one fed from an upper roll, one fed from a lower roll, which are heat sealable to form a package exterior.

U.S. Pat. No. 3,634,172 discloses an apparatus for holding two abutting tape ends in place and applying a segment of splicing material across their junction.

U.S. Pat. Nos. 3,743,197 and 3,764,085 disclose a method of and apparatus for handling material. These disclosures are directed to a threading device which slits a web of film supplied from a supply source, and uses this slit to form a leader strip which is then used in conjunction with pneumatic moving threadup devices to feed a web onto a windup roll.

U.S. Pat. No. 4,065,918 discloses a winding machine for automatically winding a sheet of material into a roll and applying a leader tape to the roll. Once a desired length is wound onto a roll, the sheet material is severed, and a tab is optionally formed by folding back the sheet material.

U.S. Pat. No. 4,322,043 discloses a web transport apparatus which is closely related to the present invention. Multiple webs are capable of being mounted on a web treatment apparatus and multiple receiving reels are provided. The web being treated, e.g. by laser, is on the active path, while the web change results in a standby web in a storage support structure. As the treated web finishes, a lateral transport means shifts the standby web into the active path, leaving the machine idle for only a brief period. This disclosure is incorporated herein by reference.

Likewise, U.S. Pat. No. 4,346,284 discloses an apparatus which is closely related to the present invention. Two independent transport paths are provided for a web of material. Thus, the treating device (e.g. a laser) is substantially constantly treating a web and the machine is never idle, except for the period required to redirect the beam and accelerate the web to full processing speed. This disclosure too is incorporated herein by reference.

U.S. Pat. No. 4,475,830 discloses a spliceless ribbon structure having a leader and trailer, e.g. for use as a transferrable ink layer ribbon for impact printing. A leader and trailer formed from double sided adhesive encapsulate the ink web at the beginning and end of the web. The ink web is fed from a master roll of ribbon stock to smaller hubs.

U.S. Pat. Nos. 4,894,674 and 5,015,089 disclose a bulk film loader for loading film cassettes from a bulk quantity of film. The film is transferred within a casing from a cartridge onto a camera film feed spool. A manually operated guillotine is provided to sever the strips, and a roll of adhesive leaders is provided.

U.S. Pat. No. 4,916,272 discloses a web roll, guide rollers, a drum for perforating, guide rollers, a guide block and a takeup roll for perforating a paper web supplied on a bobbin.

Finally, U.S. Pat. No. 5,467,676 discloses an automatic roll wrapper removing apparatus and method. Paper rolls are supplied in bobbins which are wrapped in a protective wrapper. The wrapper generally should be removed before use, and this disclosure relates to a method and apparatus for unwrapping these rolls by cutting the outer wrapper automatically.

3. Control of Perforation

Many efforts have been made to attempt to control the perforation of the substrate while it is being worked upon during normal operational speeds.

U.S. Pat. No. 4,218,606 discloses the maintaining of a constant porosity on a workpiece subjected to varying speeds by adjusting the focus point of the laser beam to create larger or smaller holes in response to porosity feedback.

U.S. Pat. No. 4,568,815 discloses the control of a laser perforator. The speed of the workpiece is detected, and the laser duty cycle is gated to provide uniform perforations.

U.S. Pat. No. 5,259,401 discloses the control of the intensity of radiation and the length of pulses in response to variations in the speed of advancement of the web past a perforator. Additional control, such as control of the intensity of radiation based on permeability, is also disclosed.

U.S. Pat. No. 5,341,824 discloses a highly sophisticated control system for a high speed perforator on a tipping paper line. Electro-optical detectors sense the porosity and control the perforation based upon a calculated pressure drop.

Finally, U.S. Pat. No. 5,367,144 discloses a comparator for determining the porosity of paper being produced by a laser perforator by comparing the paper perforated to a standard in a simultaneously applied suction unit. This is said to overcome variances in the pressure in the unit over time.

4. Other Known Art—Generally

In present operation, the rolls of material are generally unwound, the conversion function is performed upon the paper, and the new bobbin wound up on a new bobbin core.

However, substantial losses are incurred during the conversion at conversion startup. For example, the web speed is constantly changing as it ramps up to operating speed and it has been heretofore virtually impossible to control the amount of laser energy and perforation applied. Conventional rewinders cause the loss of about 25 meters of paper at startup.

This wasted paper is generally wound about the core of the rewinder, and an adhesive tab inserted into the bobbin at the point where the perforation or other conversion is within acceptable limits or of sufficient quality to be inserted into consumer or other goods, usually at a thickness of about 8 mm around the core; often as much as 12–14 mm. This is a substantial waste of paper (up to 125 meters) which must be carted around to an appropriate manufacturing facility in order that the good paper can be incorporated into consumer goods, leading to wasted space, fuel, etc.

Additionally, a conversion facility or manufacturing facility operating at large capacity generates a large volume of waste. It would be useful to reduce the labor involved in handling this waste.

No known equipment or publications address methods or apparatuses for solving this waste of a substantial length of paper. A solution to this problem is needed.

II. OBJECTS OF THE INVENTION

It is therefore an object of the present invention to reduce waste by providing a method of reducing the amount of out-of-specification paper produced in a conversion apparatus, and reducing the labor required to handle and remove such waste.

It is a further object of the present invention to provide an easily controlled conversion apparatus which yields high quality converted paper with a minimum of required adjustment from the converting facility floor operator.

III. SUMMARY OF THE INVENTION

Applicants have devised a novel apparatus and method for eliminating the startup waste from converted bobbins. The present invention virtually eliminates the need to throw away a substantial amount (e.g. about or less than 25 meters) of otherwise good paper by providing an apparatus and method for synchronizing the converting functions and capturing the little remaining waste on a separate spool while capturing only paper within a set specification on a rewinder. The apparatus also eliminates the need to have the converted rolls or bobbins contain two types of material— converted, and unconverted or insufficiently converted material. Instead, the rolls or bobbins can now contain acceptable material selectively. An automatic knife is provided to sever the web, and waste paper is more easily removed by the present invention by means of a novel spindle.

IV. BRIEF DESCRIPTION OF THE DRAWINGS

Figure 6:
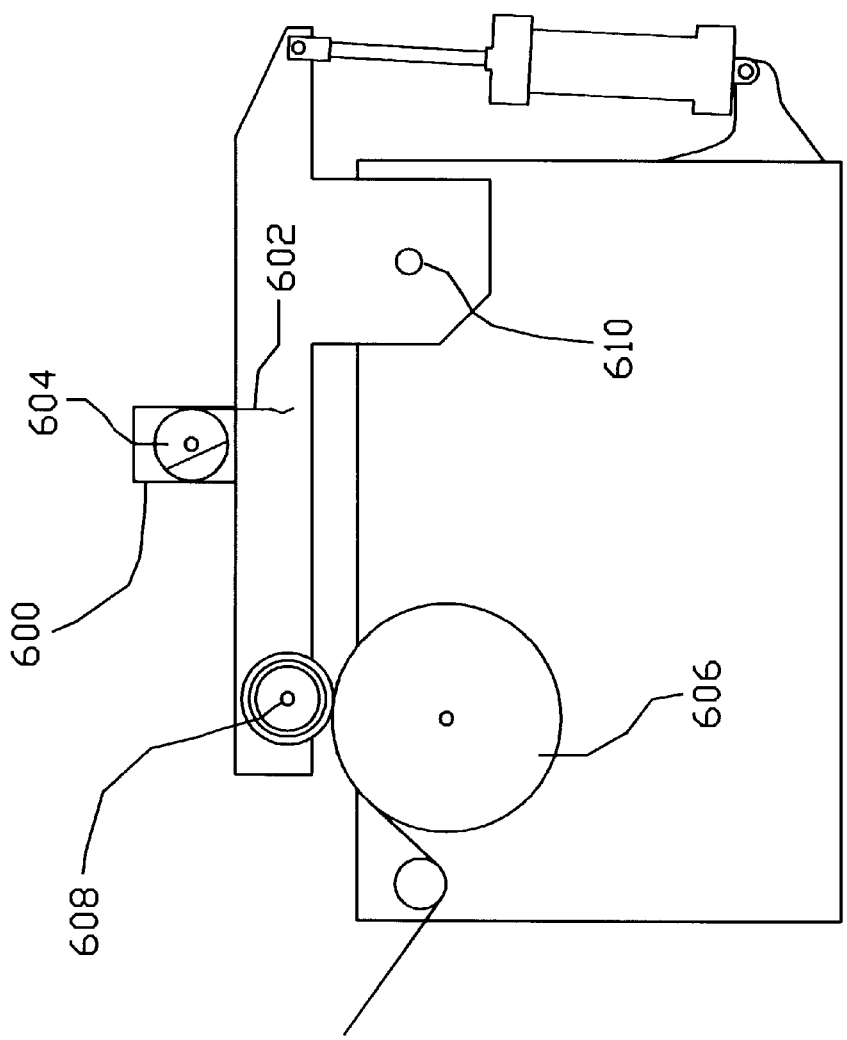

FIG. 6. is a partial side view of a rewinder and waste capture section of an apparatus according to the present invention illustrating severed waste portion.

Figure 7:
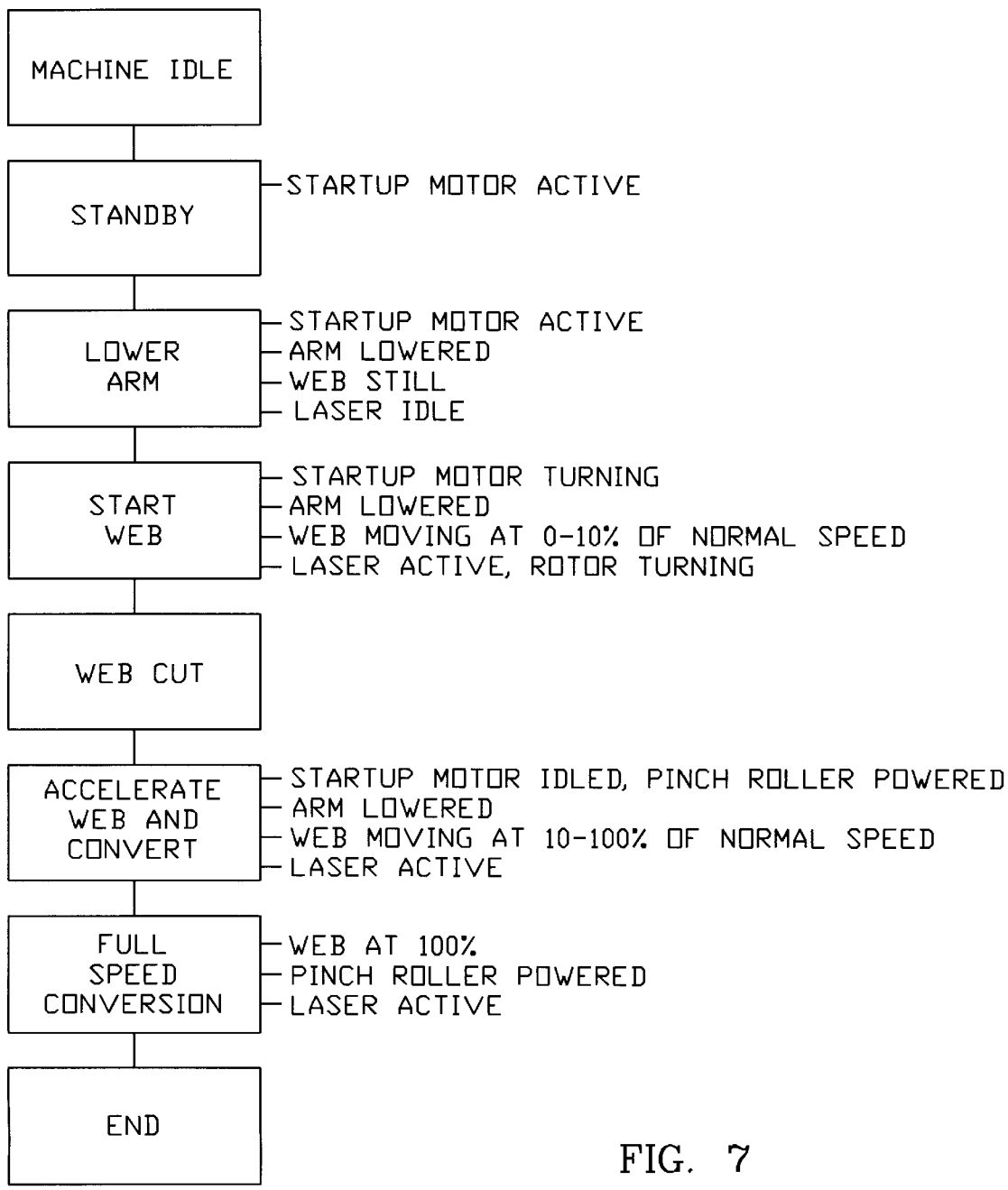

FIG. 7 is a step-block diagram illustrating a process flow for an apparatus according to the present invention.

Figure 8:
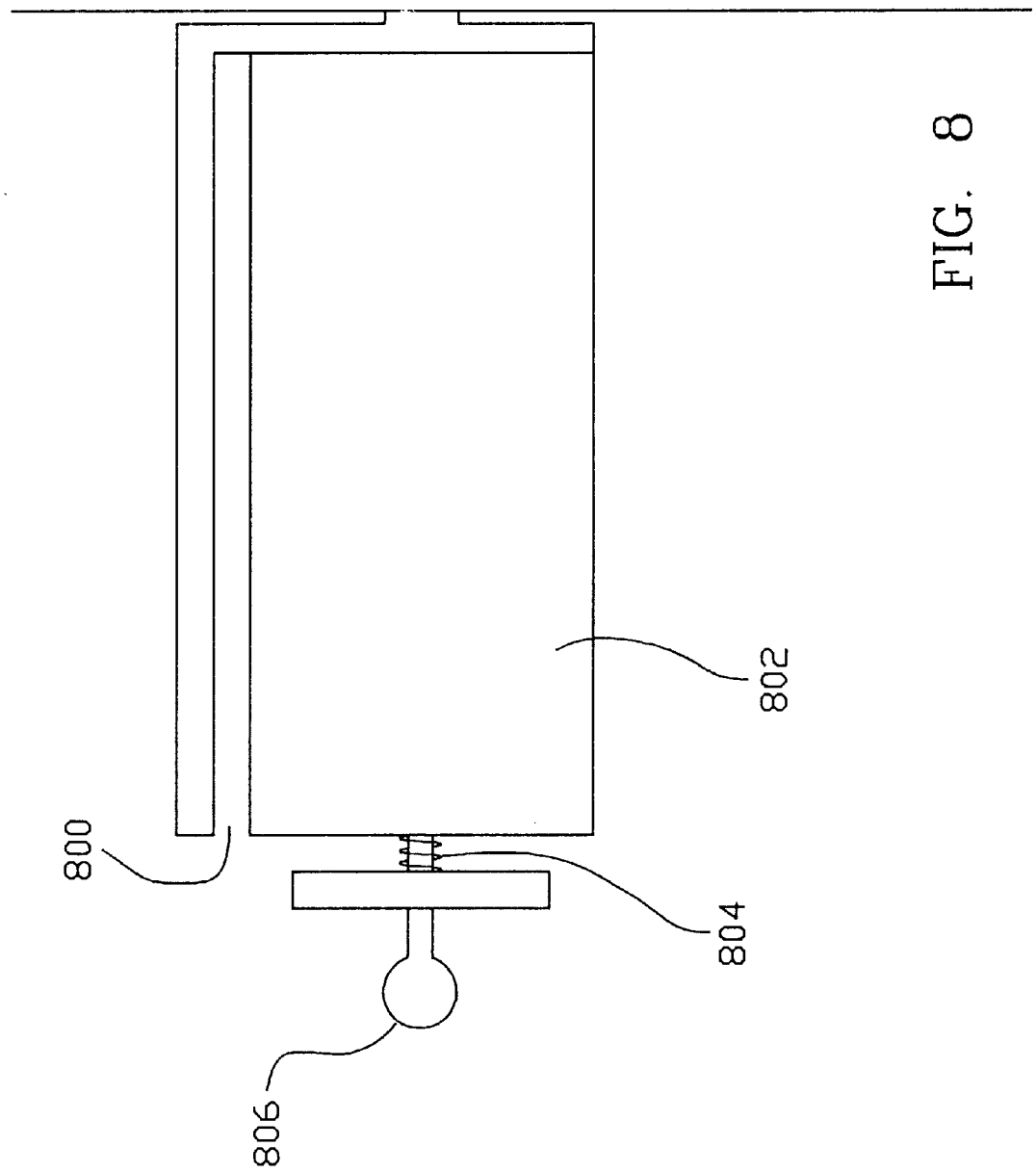

FIG. 8 is a side view of a start-up spindle according to the present invention.

Figure 9:
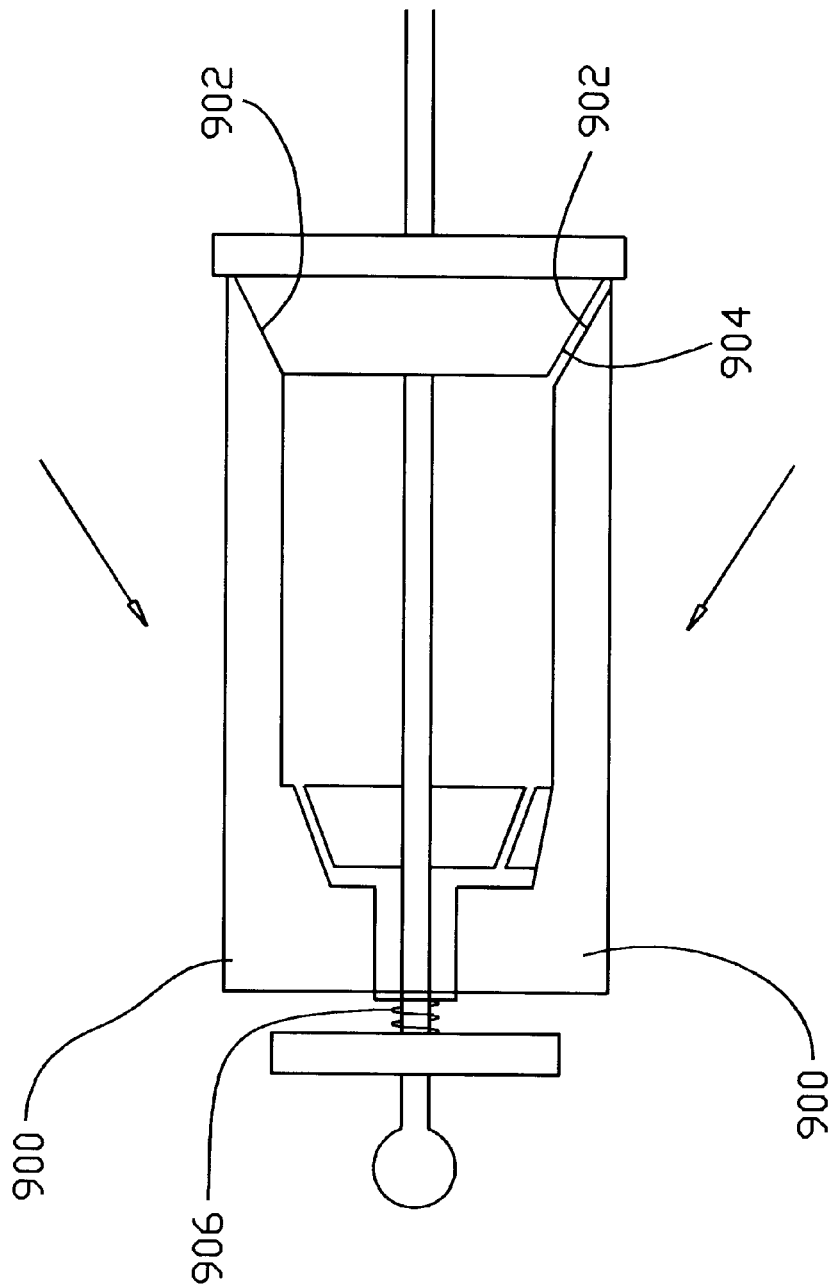

FIG. 9 is a cut away side view of a start-up spindle according to the present invention.

Figure 10B:
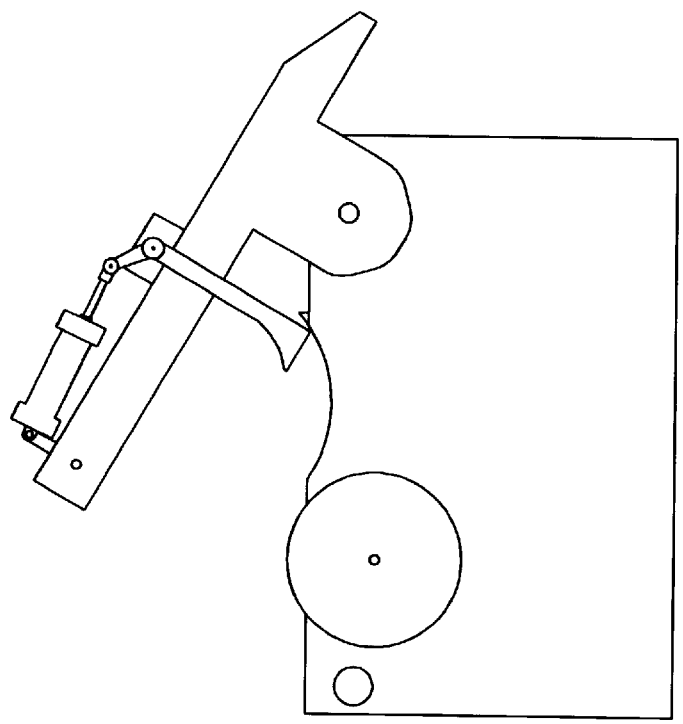
Figure 10A:
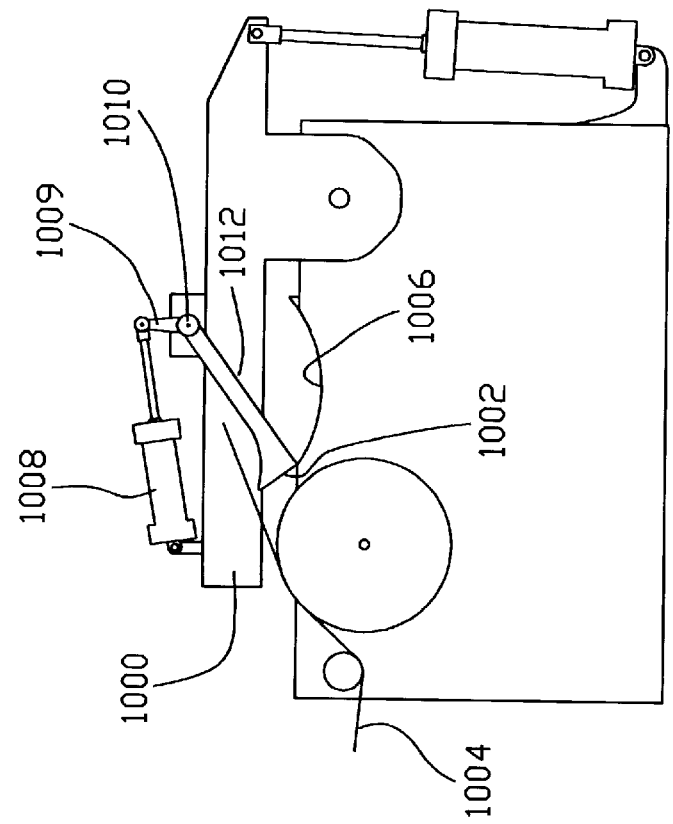

FIG. 10A is a partial side view of the rewinder and waste capture section of the present invention illustrating a preferred knife embodiment in the extended position.

FIG. 10B is a partial side view of the rewinder and waste capture section of the present invention illustrating a preferred knife embodiment in the retracted position.

Figure 11:
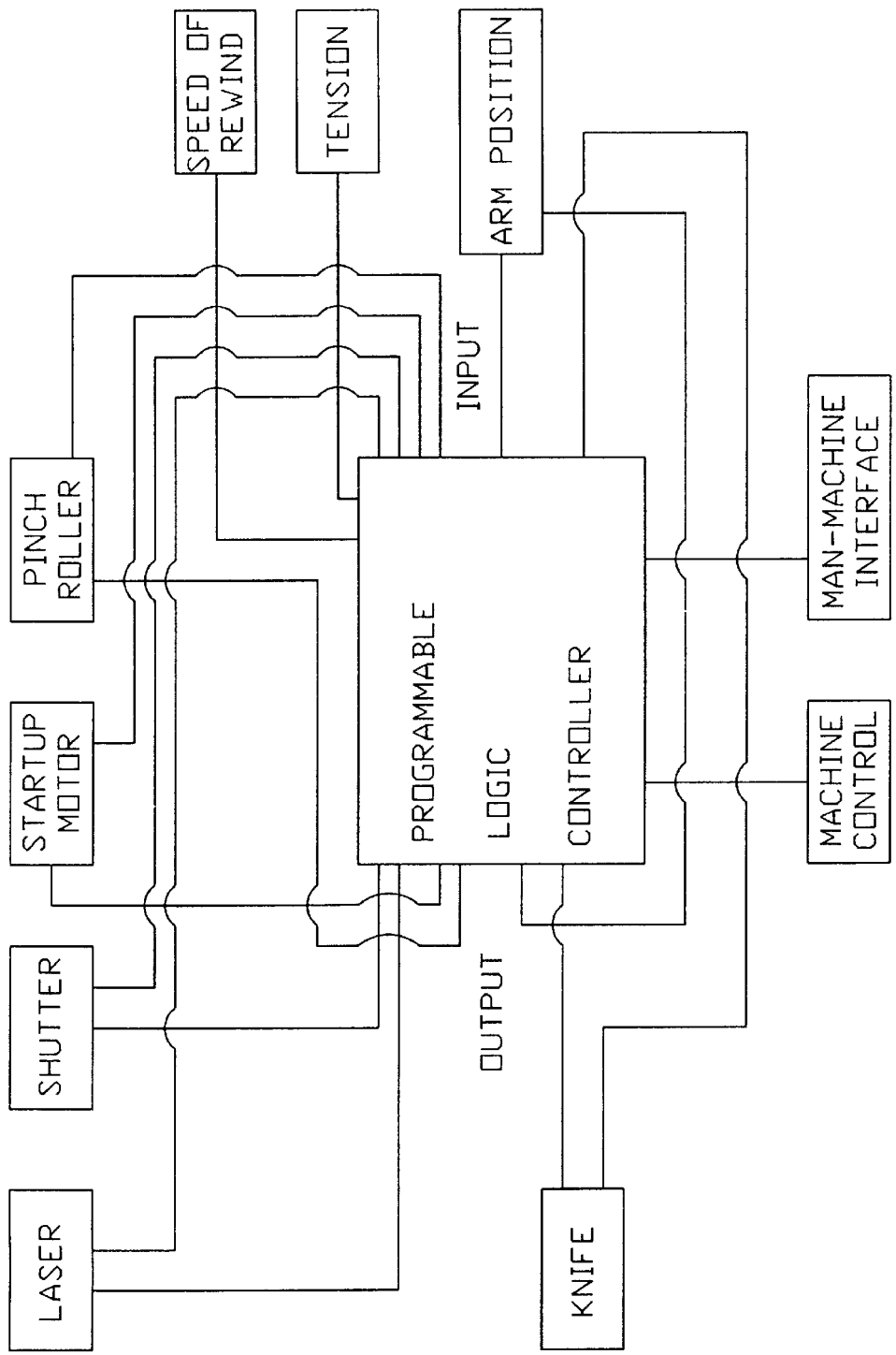

FIG. 11 is a schematic diagram of interconnections between various apparatus parts in an embodiment of the present invention.

Figure 12:
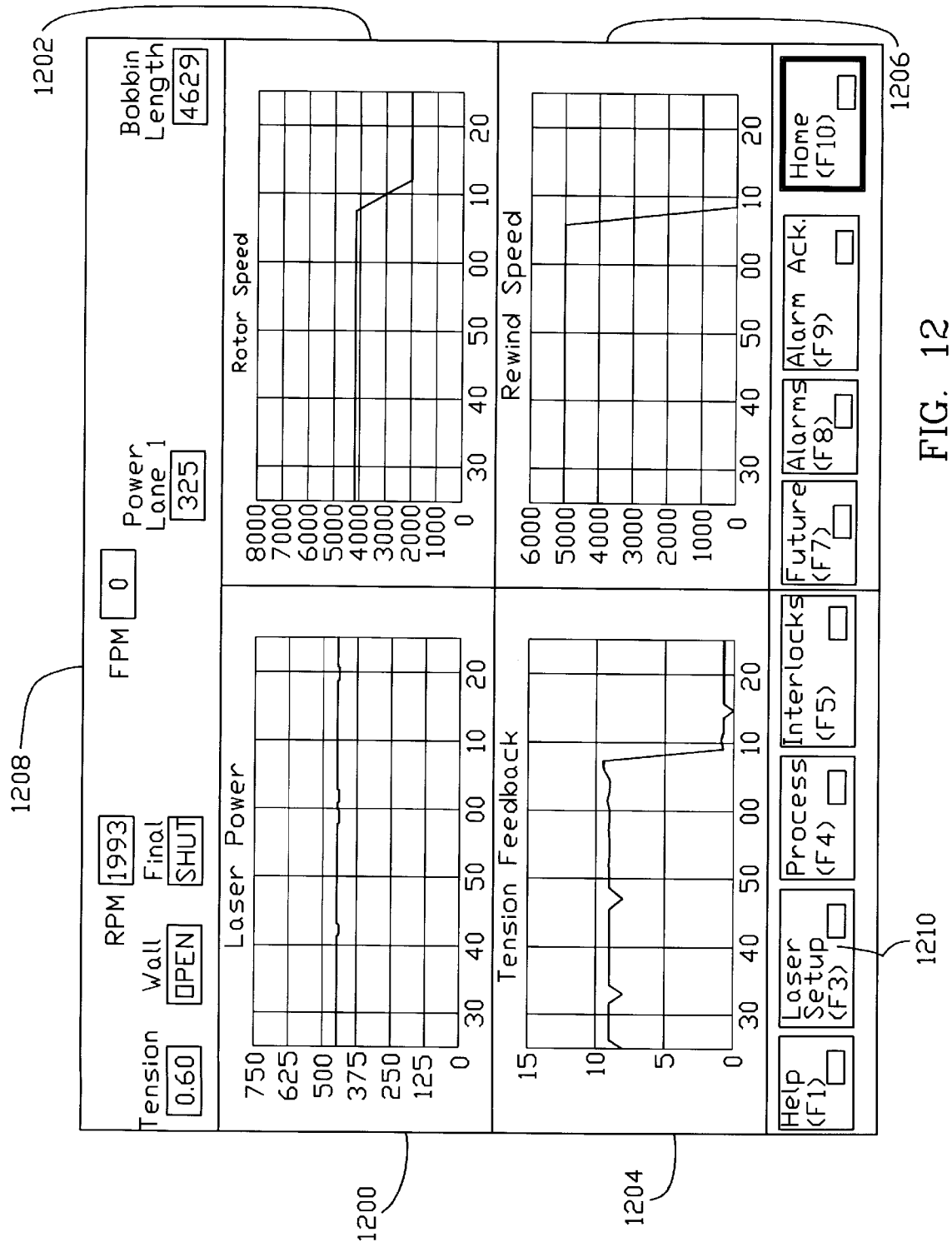

FIG. 12 is a frontal view of a control screen of an apparatus according to the present invention.

Figure 13:
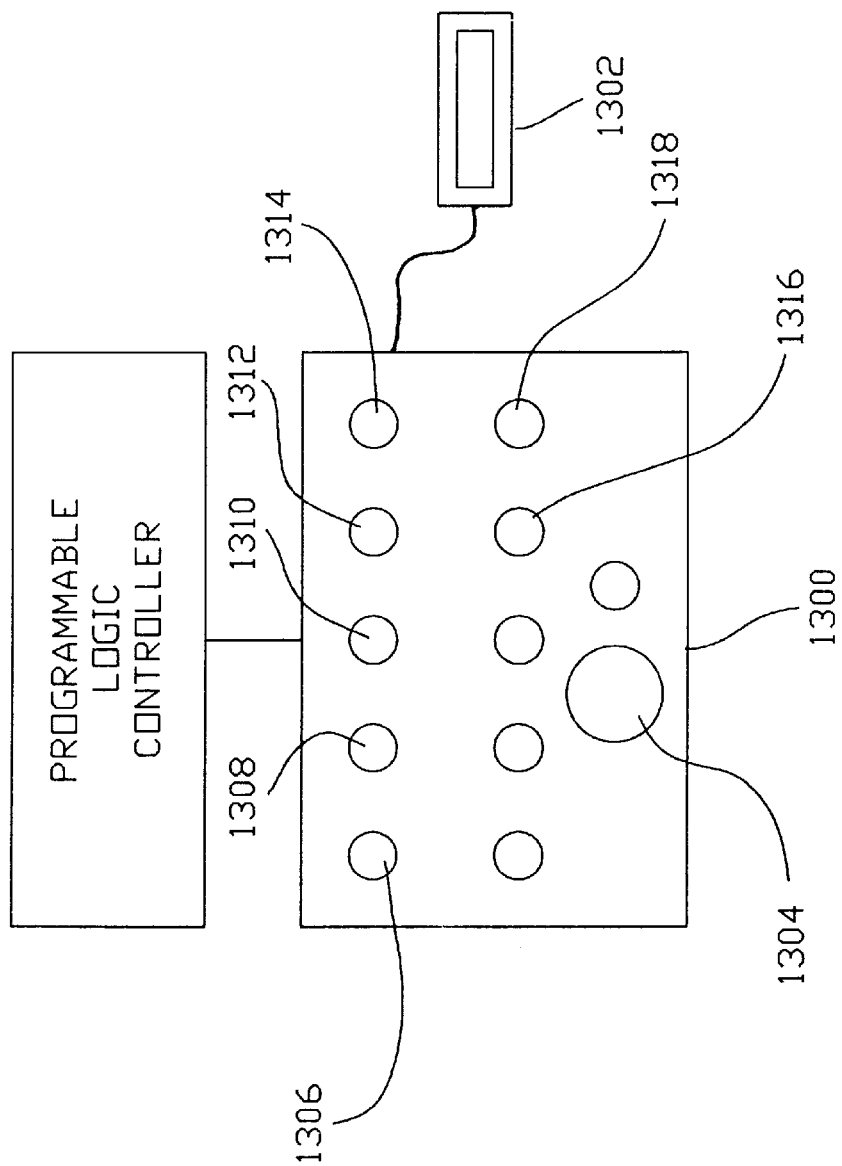

FIG. 13 is a schematic illustration of a manual control panel, scanner, and programmable logic controller incorporated into an apparatus according to the present invention.

Figure 14:
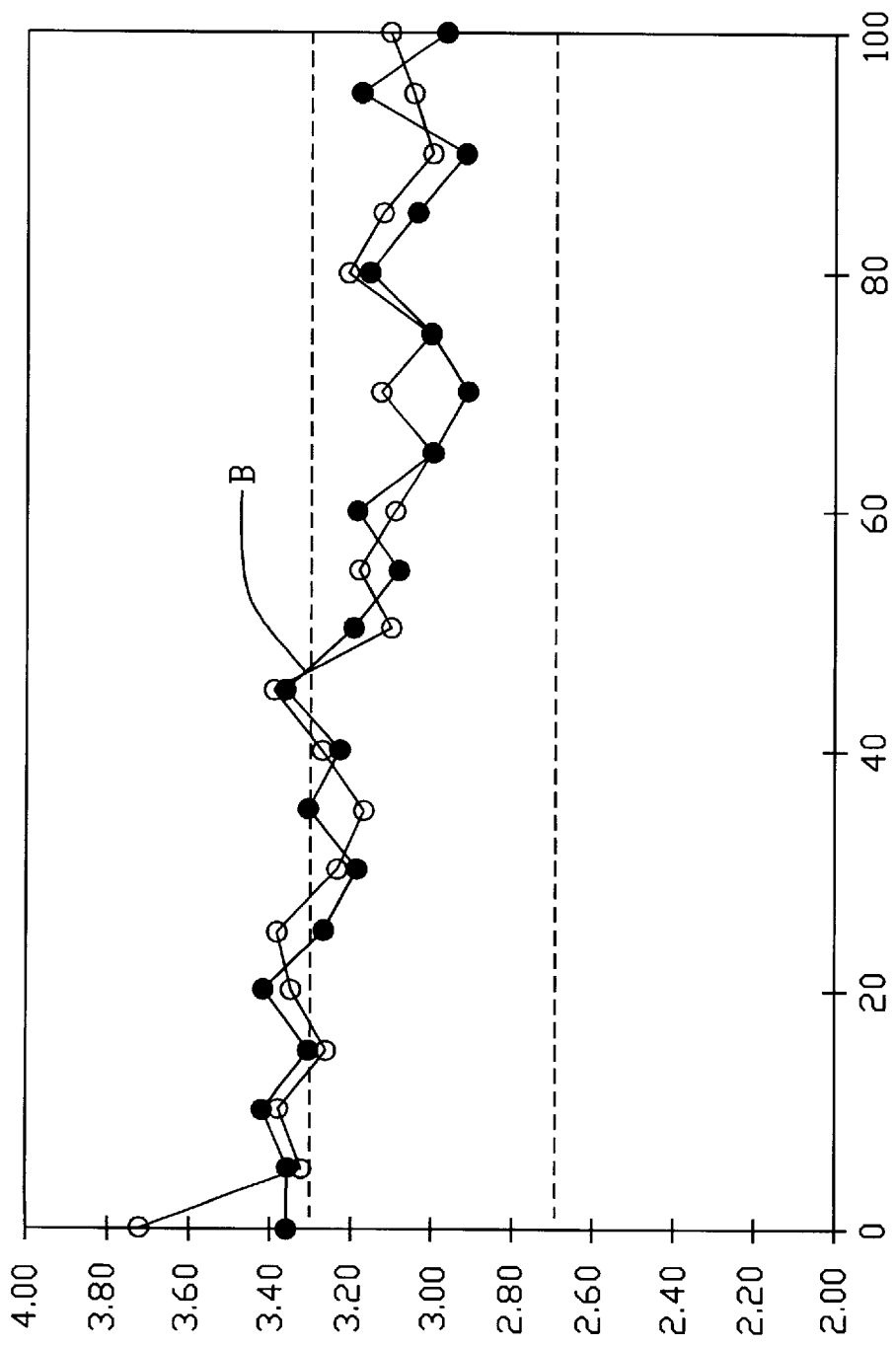

FIG. 14 is a graphical representation of pressure drop in cm of water versus percent of bobbin radius.

Figure 15:
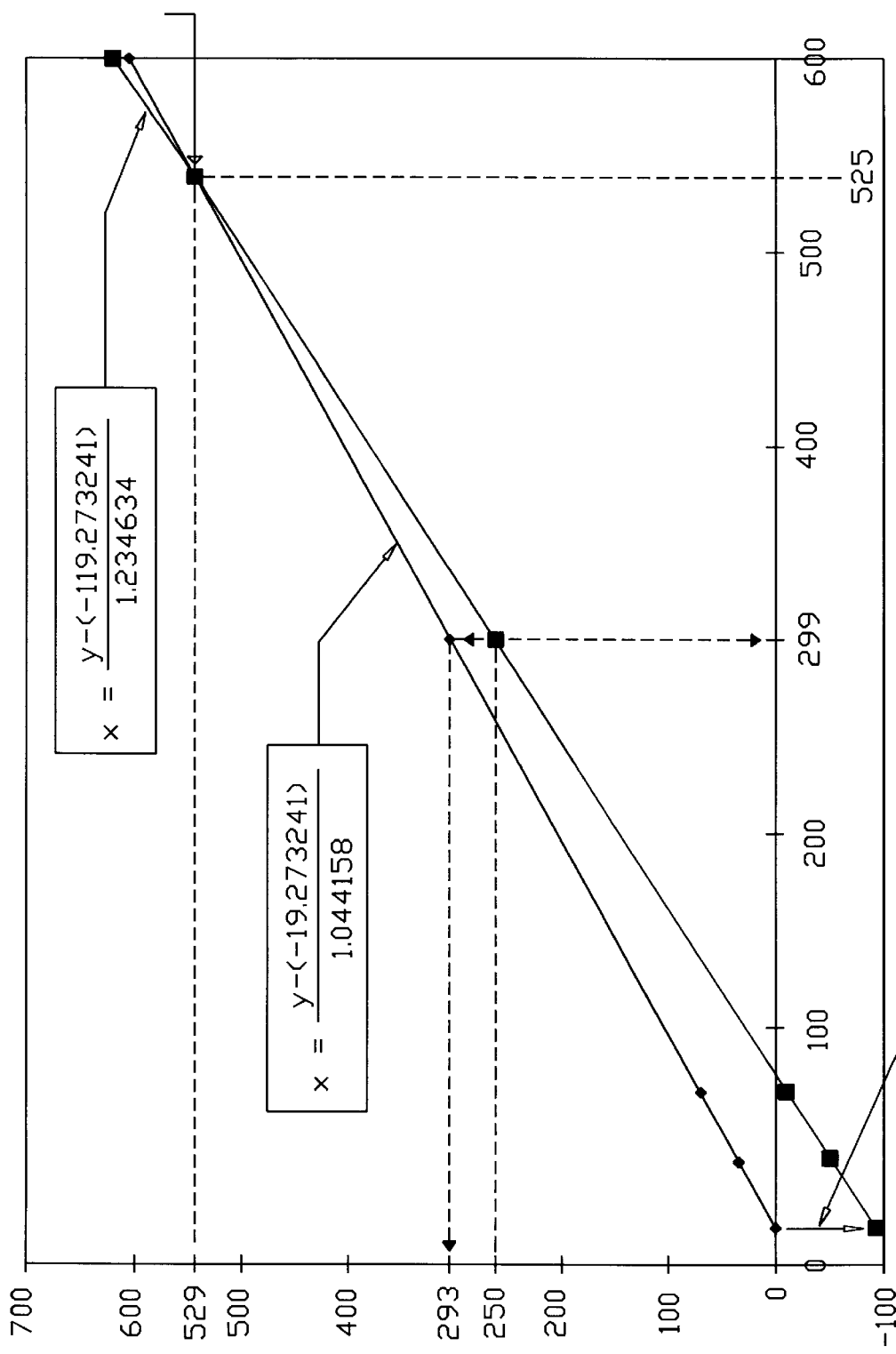

FIG. 15 is a graphical representation of a biasing equation to correct for laser power fluctuations.

Figure 16:
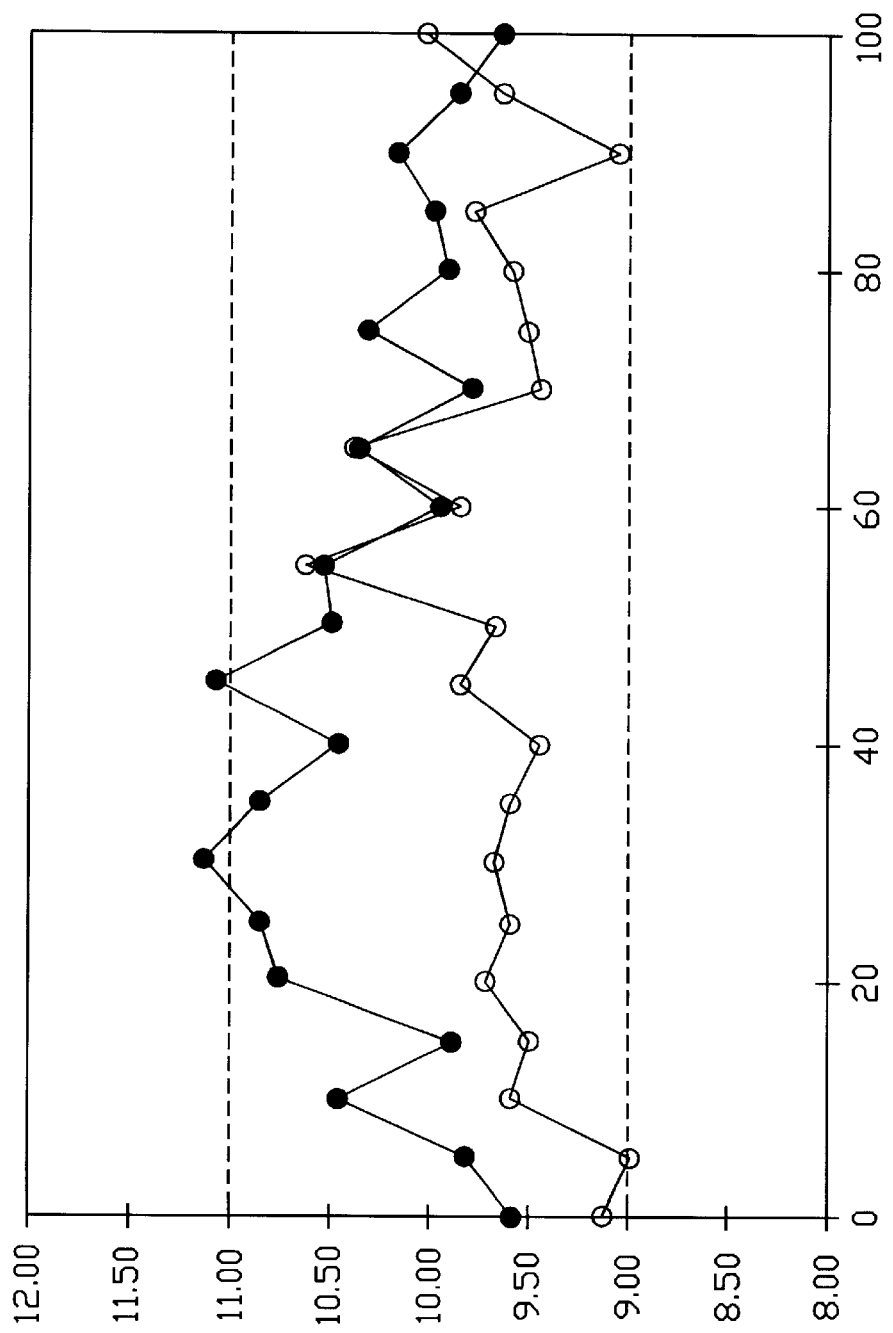

FIG. 16 is a graphical representation of pressure drop in cm of water versus percent of bobbin radius.

IV. DETAILED DESCRIPTION OF THE PREFERRED EMBODIMENTS

Figure 1:
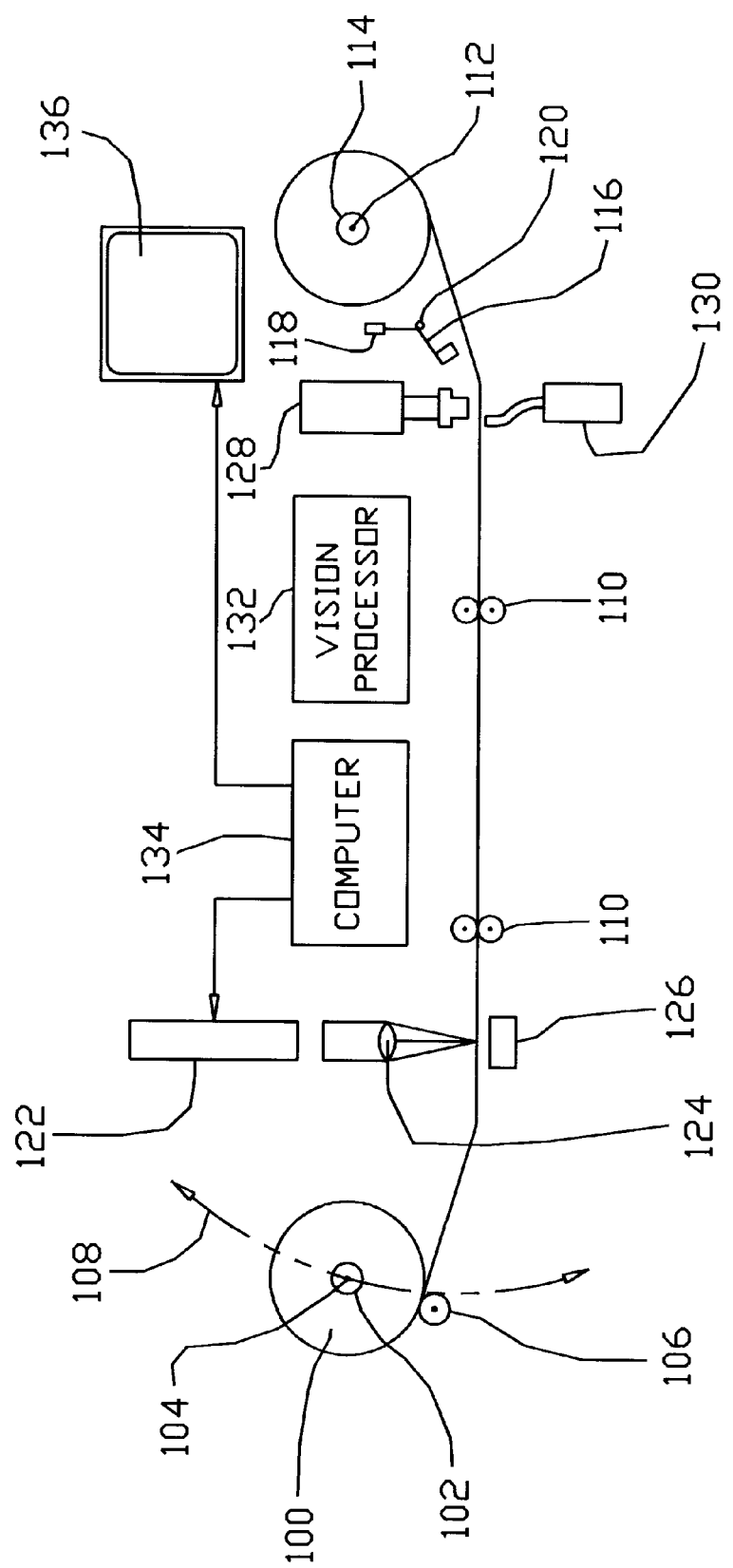
FIG. 1 is a side view of a prior art converting apparatus.

A prior art conversion system is seen in FIG. 1. A supply bobbin 100 of paper or other material is supplied wound about a core 102. The paper is mounted by an operator on spindle 104 which is capable of having adjustable resistance provided to it by a brake internal to the spindle, or by a roller 106. The spindle 104 may be displaceable along arcuate path 108 (shown in double arrowheaded dotted line on FIG. 1) to allow for substantially uniform contact between spindle 104 and roller 106 as the bobbin decreases in radius. Alternatively, the bobbin may be fixed if an internal brake is used.

For clarity, the takeup spindle is illustrated as fixed, but it too can be arcuately displaceable in the same manner as the first spindle.

The flexible web is then threaded by an operator between guide rollers 110 to takeup spindle 112. Takeup spindle 112 is fitted with previously empty core 114, and the web is fixed by means of an adhesive such as tape to the core. The apparatus is then started, and when the speed reaches a preset level, a tab inserter 116 is actuated by pneumatic or hydraulic jack 118 which pivots it about axle 120.

In the interim, laser 122 is either off or the beam is not in contact with the paper. Once the speed reaches a preset level for the amount of perforation to be appropriate, the laser is activated, or the laser beam directed by focusing means 124 to contact the paper on a predetermined duty cycle which matches the preset speed. Heat sink 126 absorbs excess laser energy. Periodic adjustments are made upon visual inspection by camera 128 and light source 130. A visual processor 132 interprets the visual signal, and a computer 134 can control the laser 122 and display results for an operator to control on display 136.

A substantial amount of paper is wasted before the appropriate speed is reached and the tab is inserted into the roll. In an industry where the number of bobbins is in the millions, it would be quite useful to have a solution to the problem.

Figure 2:
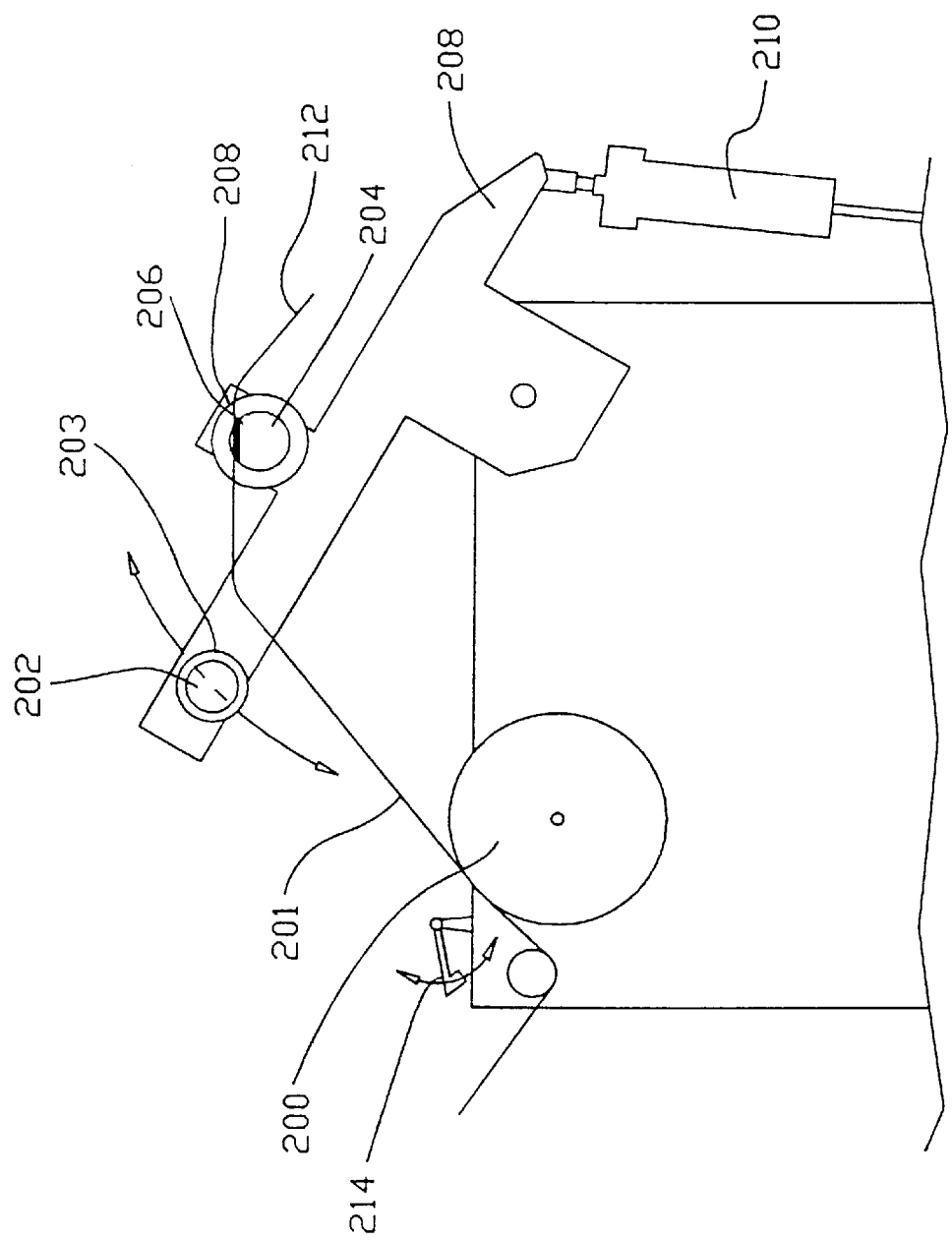
FIG. 2 is a partial side view of the rewinder and waste capture section of an apparatus according to the present invention with web loosely threaded and the pivot arm in the raised position.

An exemplary apparatus according to the present invention, which presents a novel solution to this problem, is illustrated in part in FIG. 2, reflecting the takeup section of the bobbin rewinder.

Pinch roller 200 is preferably a variable speed direct driven roller. The motor may also be belt driven, but for accuracy of stepping up the speeds rapidly, direct drive is most preferred. Preferably, its surface is coated with an extremely durable material, e.g. industrial diamond or the like, with sufficient roughness to assure a firm grip on the web material passing through.

The paper or other web 201 can be fed between the pinch roller 200 and the receiving spindle 202 having bobbin core 203 thereon, thence into startup roller 204. Startup spindle 204 is preferably provided with slot 206 into which the web is fed. An operator may wrap the web around the startup spindle, or have the spindle wrap automatically upon engaging powered rotation.

Both the startup roller and receiving roller are preferentially mounted upon pivot arm 208 which is hydraulically or pneumatically activated by jack 210. Startup roller 206 is driven by a variable torque/speed motor 212. A piece of double sided adhesive is provided on the end of swing arm 214. Swing arm 214 is pivotable such that its distal end intersects the paper path at the end of its travel between the paper path and second spindle.

Figure 3:
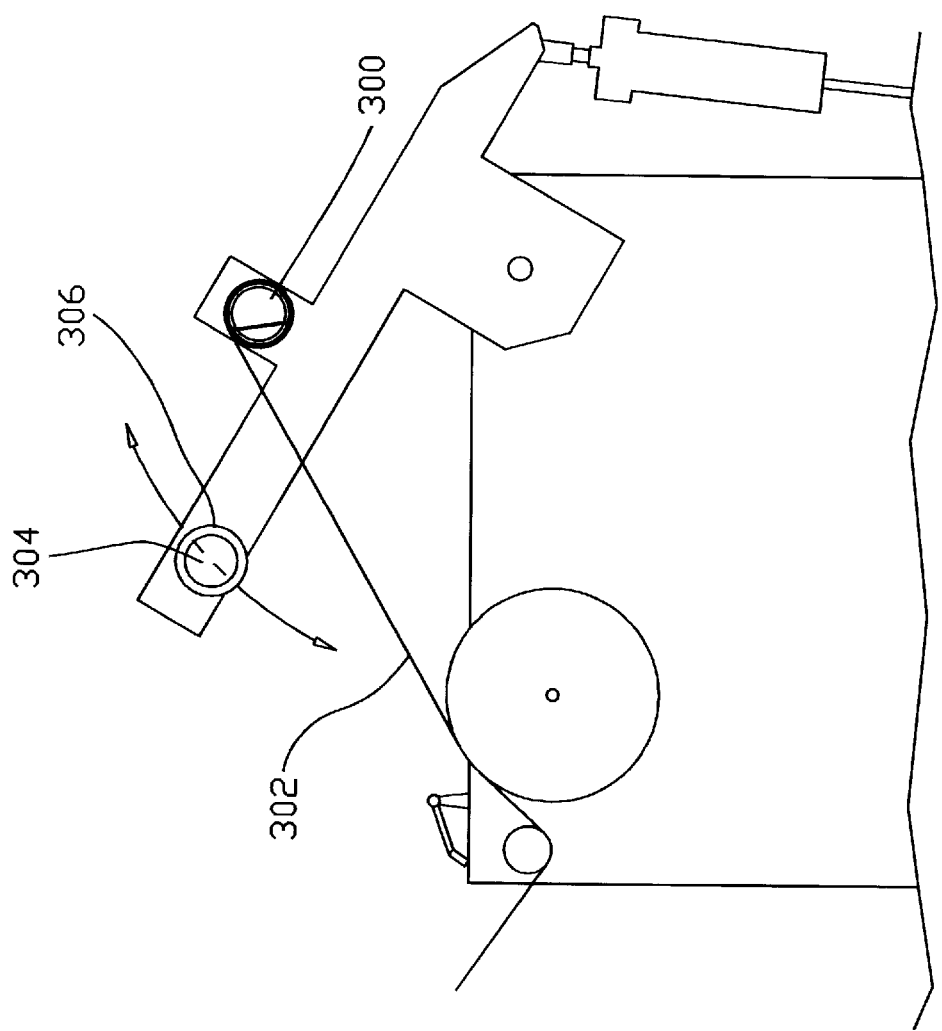
FIG. 3 is a partial side view of the rewinder and waste capture section of an apparatus according to the present invention with the pivot arm in a raised state and the web under tension.

FIG. 3 illustrates the next step in use. The startup spindle 300 has been provided with a preliminary engaging torque and the web 302 is under minor tension. Second spindle 304 has been fitted with a bobbin core 306.

Figure 4:
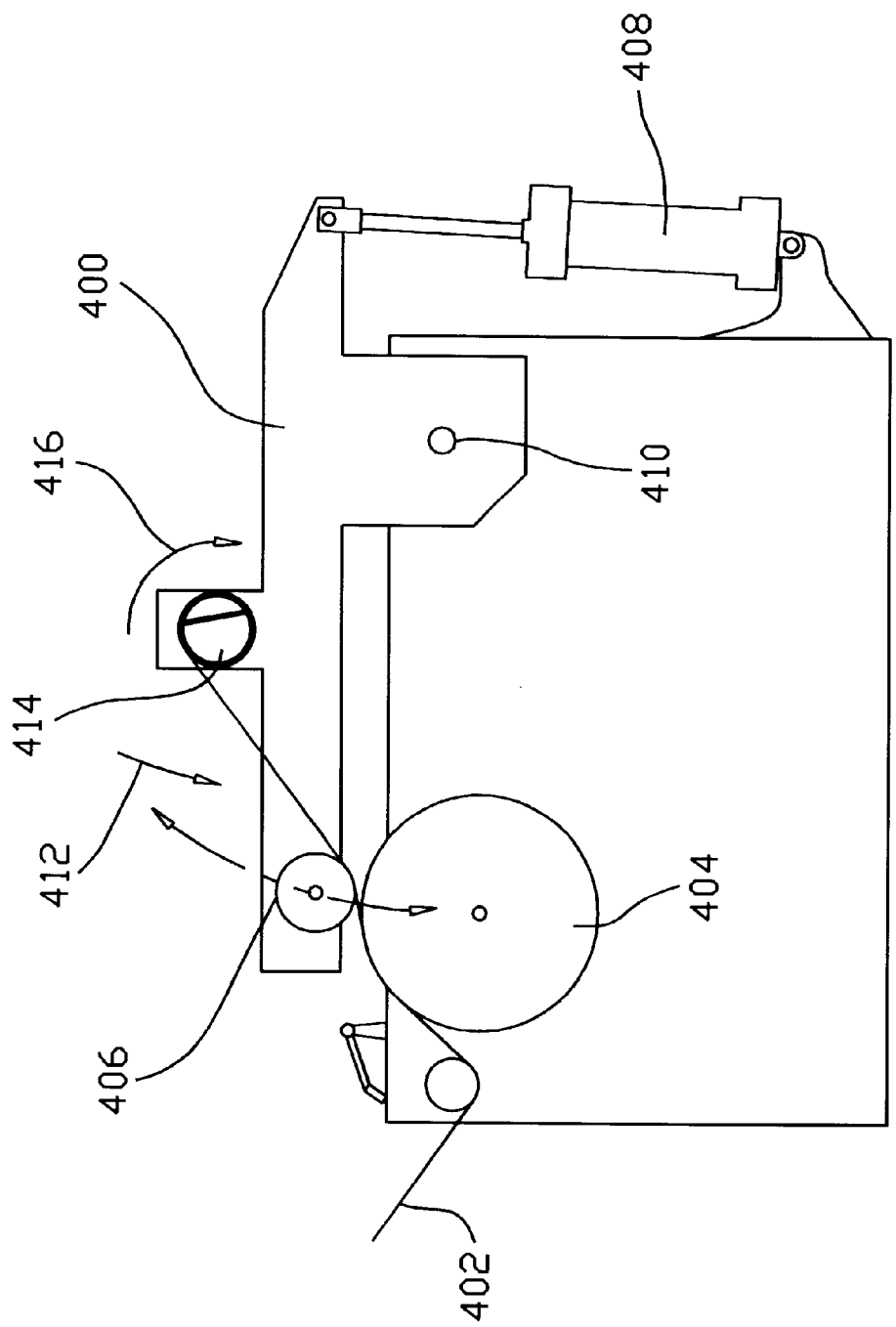
FIG. 4 is a partial side view of a rewinder and waste capture section of an apparatus according to the present invention with the pivot arm in a lowered state.

In FIG. 4, the pivot arm 400 has been lowered to engage the web 402 between pinch roller 404 and receiving spindle 406 by extension of jack 408 causing pivoting about point 410. The pivot arm has traveled in the direction of arrow 412. The startup spindle 414 is tensioning in the direction of arrow 416.

Figure 5:
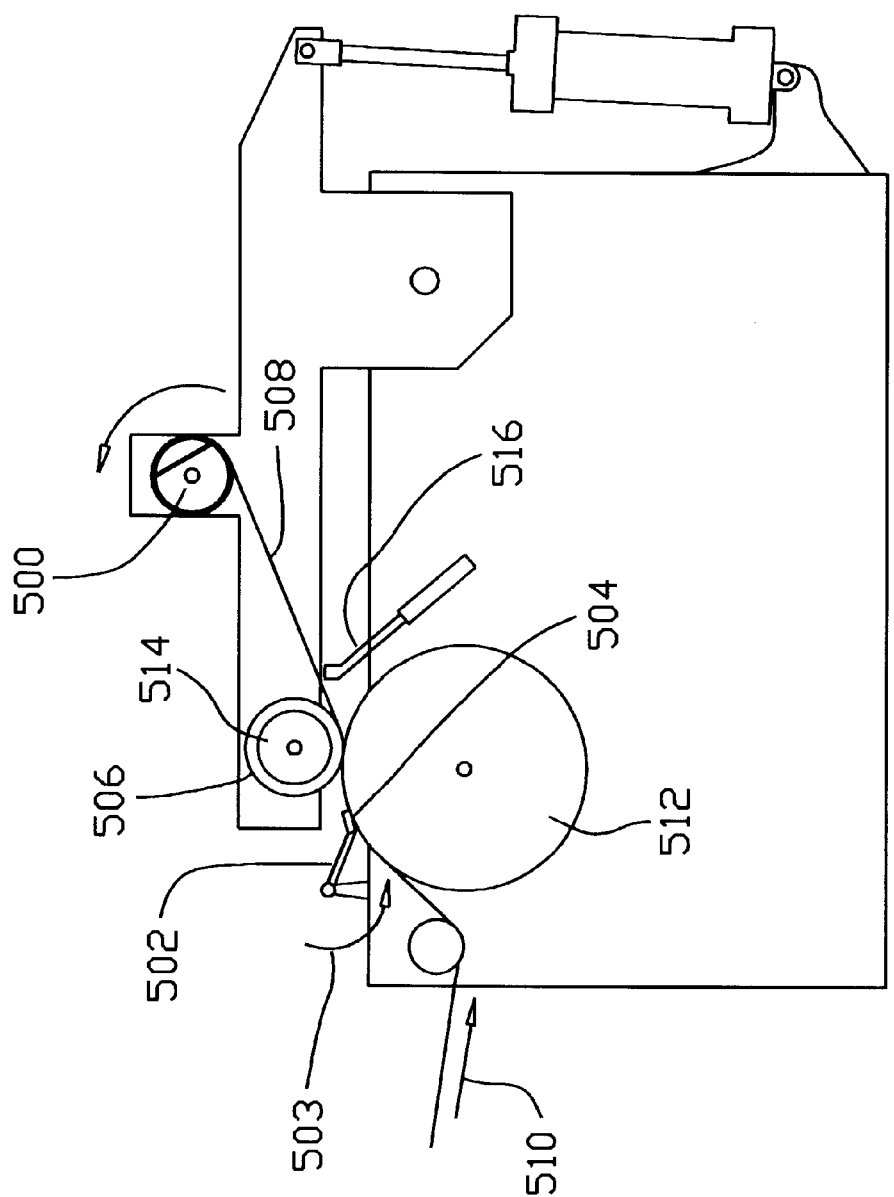
FIG. 5 is a partial side view of a rewinder and waste capture section of the present invention illustrating a tab inserter and knife.

In FIG. 5, the startup spindle has begun accelerating the web in the direction of arrow 500. Note the direction of rotation is unimportant; and differs from FIG. 4 to FIG. 5 by way of example. The web is rapidly accelerated to speed by spindle 500. When the computer determines that machine parameters are correct for a desired product characteristic, or otherwise that the quality of the converted web is acceptable, the swing arm 502 swings in the direction of arrow 503, inserting double-sided adhesive strip 504 between bobbin core 506 and web 508. Note that the web 508 is traveling in the direction of arrow 510. The direction of travel of the web compresses the double sided adhesive between the core and the web between pinch roller 512 and bobbin core 506 on spindle 514. Shortly thereafter, knife 516 is fired, hydraulically or pneumatically, severing web 508.

In FIG. 6, the startup motor 600 is idled and abbreviated waste web 602 dangles from the startup spindle 604. Pinch roller 606 drives the web onto receiving spindle 608. The arm is free to pivot about point 610 as the bobbin fills up with only the converted web material having a desired product characteristic. Upon completion of the bobbin, the pivot arm is extended again in the manner of FIG. 2. When the web finishes, the pinch roller stops and braking means are applied. Startup motor may preferably be a step motor with variable torque and speed.

The operator then resets the machine, removing the completed bobbin, and replacing a fresh bobbin on the first spindle. A new bobbin core is placed on the receiving spindle, and the waste paper wrapped around the startup spindle is removed.

Precise control of the machine is required for maximum savings to be realized over the standard perforation and rewinding techniques known in the art. This precise control is attainable by control of various parameters of the operation.

The parameters which need to be carefully controlled and measured upon startup when laser perforating include web speed, laser intensity, and rotor speed. An exemplary run of the inventive method in conjunction with the apparatus is discussed below with reference to FIG. 7.

Initially, the machine is at idle. In this status, the web speed is at zero, the laser is at a holding wattage, the laser rotor is idling, and the final shutter is closed. The operator is performing routine maintenance if it is a single track machine—such as inserting new adhesive strips onto a swing arm, changing bobbins, and cleaning dust from the machine. The apparatus according to the present invention could, however, be utilized in conjunction with a dual track machine.

Once the web is threaded to the startup spindle in the slot provided, the machine is placed on standby. In the standby mode, the startup spindle has engaged in a light torque to tension the web. The laser is brought to a state of readiness by preparing the appropriate starting wattage and rotor speed, but it is not active in that it is not emitting a beam.

The pivot arm is lowered, firmly engaging the web between a pinch roller and the bobbin core on the receiving spindle. A sensor notes the location of the arm, and the startup motor continues to tension the web, pulling it tight along the path.

The next step activates the machine. The startup motor accelerates the web rapidly, pulling it taught through the machine and bringing it to approximately 10% of full speed in a matter of about or less than 1 second. The laser is directed to the web and begins carefully controlled perforation. Optionally, a camera may inspect the web and determine acceptability.

As soon as perforated section (by computational expectation or the inspected and determined acceptable section) reaches the pinch roller and bobbin core on receiving spindle, the swinging arm inserts the double sided adhesive to hold the paper onto the bobbin core. Mere milliseconds later (between 10–100 milliseconds, preferably around 20–40 milliseconds at 300–500 feet per second) the knife is activated and severs the web before the adhered portion. The receiving spindle and bobbin core then receive the bobbin of converted paper through the remainder of its acceleration.

Applicants have also devised a novel spindle for use with this apparatus. Since the waste paper is wrapped around a naked spindle, i.e. one without a bobbin core, it is frequently wrapped tightly and difficult to remove. A novel spindle as seen in FIG. 8 allows a one step securing of the paper in the spindle, and an easy removal of the wound paper.

Turning now to FIG. 8, a spindle in accord with the present invention is seen. Groove or slot 800 is provided in the spindle for the insertion of a web of material. The remaining body of the spindle 802 is spring loaded and normally biased by spring 804 in the direction away from handle 806.

The interior of the novel spindle is seen in FIG. 9. The mandrel is preferentially split into halves which are displaceable. The mandrel may optionally be further split (e.g. into thirds, quarters, etc. biased by a compression ring). Each half 900 is formed with at least one angled internal surface 902, and the spindle shaft is formed with a circular inner spacer having a corresponding angled surface 904. Normally biased inward by spring 906, the spindle reduces in diameter as an operator pulls it forward, easing removal of the paper. This is occasioned by the sliding of the angled surfaces relative to each other, allowing the spindle to decrease its diameter.

An additional feature of the instant invention which contributes to the efficiency of the invention is the cutting means. A straight or serrated cutting knife operating on a linear track or linearly displaced by a pneumatic jack can be employed as seen in FIG. 5. However, a straight track cutting means can leave the blade intruding upon a work area. A preferable novel blade retractor, linked to the pivot arm, is seen in FIGS. 10A and 10B. FIG. 10A illustrates the lowered position of pivot arm 1000. The blade 1002 is in close proximity to web 1004 by virtue of its being slid along arcuate path 1006.

When the blade is actuated, pneumatic jack 1008 fires and retracts rapidly, driving connecting arm 1009 to pivot about point 1010. This drives knife arm 1012 to drive the knife into the paper or web headed to the startup spindle, severing the web and retracting the knife. As the bobbin fills, the arm is gradually lifted. In its extreme position seen in figure 10B, the arm is raised for bobbin removal. Note the blade is well removed from the work area.

A variable power laser, such as that available from PRC Corporation in Landing, N.J. is utilized as the cutting beam origin. The laser is pre-calibrated for various wattages, e.g. 50, 100, 150, 250, 300, 400, 500, and 600 watt outputs. The laser power is controlled by the programmable logic controller for fluctuations and variances. The laser should be preferably capable of high accuracy at lower power settings, e.g. in the 0–100 watt range due to the low web speeds at startup.

The lasers generally "simmer" at 50 watts when at idle, and at full power generally are from about 550–600 watts per beam, but may be stepped up in preselected amounts or rates. The beam is focused down to a point, and a large rotating aluminum beam chopping, or shutter, disc with slots chops the beam to allow for pulses of laser to form discrete perforations. The aluminum disc functions as a shutter, and the beam can be controlled by varying the size and shape of apertures. The aluminum disc speed is adjustable and also controlled by the output from the programmable logic controller.

The startup motor which drives the third spindle is most preferably a step motor with extremely sensitive speed control. It enables a rapid increase to approximately 300–600 feet per second in the bobbin. It, likewise, is controlled by the programmable logic controller. The motor which drives the pinch roller is an AC variable frequency motor.

The various sensors or computed outputs, e.g. web speed, laser ready at power, rotor speed, transmit signals to the programmable logic controller, which adjusts each to produce a perforation pattern which is acceptable. Once the parameters are deemed acceptable, the programmable logic controller fires the adhesive arm, and waits a predetermined delay period.

A solenoid valve, controlled by the programmable logic controller, fires the knife to cut the web. The programmable logic controller then shuts down the startup motor and drives the pinch roller through the remainder of the acceleration and full speed perforation.

Perforators run at up to 5400 feet per minute, the cut is usually at about 10% of that speed. That speed is referred to as "crawl 2", the speed before the cut of waste paper from good paper is made. Crawl 1 allows the paper to tighten up and drop into place, crawl 2 is the startup web accelerator, and final acceleration is the full acceleration to full speed.

Software Control

The logic circuits and control of the apparatus will now be discussed in more detail. A Programmable Logic Controller and associated computer based operator interface software controls the operation of the apparatus.

In its presently preferred form, the controller is an Allen Bradley Programmable Logic Controller Model 5-20 (PLC 5-20). The operator interface to the programmable controller is an IBM 486 DX 2, but the software could be run on more powerful hardware, e.g. Pentium™-based NT systems.

The program which controls the operation most efficiently is as follows. First, it is capable of a maintenance mode operation. This routine allows the operator to take a machine offline and test each individual component without running the machine. For example, if a servomotor fails to engage, a forced output can compel the motor to engage. If the motor still fails to engage, the maintenance problem can be diagnosed as a hardware problem versus a software problem. Therefore, the software is preferably capable of this maintenance mode.

When the system enter or leaves the maintenance mode, it removes all of the forced maintenance settings.

For the system to operate most effectively, it is preferably configured to calculate speeds at which the web must run, laser power output, tension, and rotor speed. Alternatively, it may access numerous databases of historical information derived from prior perforation or other conversion runs. These runs will generally be unique to each laser and perforator. These databases may also include laser power, web speed, tension, and rewind speed.

Most preferably, the laser output and rotor speed is commanded to match the web speed commanded by the PLC. Fundamentally, if it is assumed that the speed of the web for a particular machine is "x", one of skill now can calculate the rotor speed and laser power required to perforate at low speed.

These types of inputs and calculations together enable the machine to be more accurately controlled at slow startup speeds; allowing acceptably converted material to be more rapidly acquired from the converting apparatus.

FIG. 11 is a schematic of the various feedback loops involved in controlling the machine accurately. The center of the control is preferably a programmable logic controller, linked by sensor and control circuitry to the laser, shutter, startup motor, pinch roller, pivot arm, knife, man-machine interface (display) and machine control.

FIG. 12 illustrates the presently preferred man-machine interface display screen. Four primary processing parameters are illustrated. Screen 1200 illustrates the laser power in watts on the y-axis against a scrolling x axis of time. Screen 1202 illustrates the rotor speed in rpm on the y axis against the scrolling x axis of time. Screen 1204 illustrates the tension feedback in pounds on the y axis versus a scrolling x axis of time. Finally, the rewind speed in feet per minute on the y axis is displayed in screen sector 1206.

Screen sector 1208 displays status information, e.g. a numerical display of tension, rotor speed, brand, optionally identification (e.g. pallet and bobbin numbers) for tracking (which can be entered by conventional barcode scanning), shift, bobbin length, statuses of various systems, e.g. water, air, final shutters open or closed, vacuum, and laser power delivery per lane. This display provides useful status information as well as a handy reference for the actual program description which follows.

FIG. 13 illustrates an exemplary simple machine control. Housing 1300, along with the remainder of the equipment, is preferably dustproof, as converting operations generate paper and ash dust. Optionally, air streams may be directed into operating orifices, and positive pressure maintained in housings. Each manual input is large and conspicuously labeled for ease of operation. The machine control may be linked to a laser scanner 1302 for inputting bar code type information from a label accompanying the web material to be converted for ease of component tracking. This input may go directly to the programmable logic controller for insertion into a database and is also optionally displayed upon the man machine interface screen illustrated in FIG. 12.

The controls are variable, but for purposes of conversion, certain controls are preferred. A conspicuous "emergency stop" button 1304 is useful for a crash stop of the machine. A reset button 1306 returns the machine to a pre-operative condition. For example, the lasers are returned to idle power, the rotors are idled, and the final shutters are closed. A preset button 1308 prepares the machine for a converting operation. Pinch rollers are released, the appropriate arms are raised, and the paper path is opened for feeding the paper into the machine path.

A ready button 1310 is actuatable when the paper is appropriately fed. The ready button closes the paper path, optionally brings the lasers to a warmed up status, and accelerates the final shutter rotor to a speed which approximates the speed necessary for perforation to begin. The web is also tensioned by actuating the startup motor and taking up the slack. The "on" or "go" button 1312 begins the actual conversion operation and transfers control of the machine to the programmable logic controller. The stop button 1314 shuts down the machine.

Various optional additional buttons can directly control other preferred machine functions. A vacuum for removing dust or air stream may be remotely actuated by the controls at panel 1300, or the pivot arm may be independently raised or lowered with arm up button 1316 and arm down button 1318.

The PLC commands the machine to rapidly reach a perforation setting where it generates properly perforated or otherwise converted paper at an appropriate speed. Once the preset button is pushed, the software is prepared to undertake calculations to adjust laser power, rotor speeds, tension, and web speed.

The laser power is normally environmentally variable according to numerous parameters. The nominal power output can be affected by tube fluctuations, dirt in the final lenses, dust, excess moisture and humidity, etc.

The software is preferably configured to analyze the nominal output and preferably adjust it by running a slope intercept conversion according to the well known $y=mx+b$ formula, where power in (x) is assumed to be linear to power out (y) given a conversion factor (m); with an adjustment factor (b) for the various confounding factors. Thus, each laser beam is individually tailored for final output.

Rotor speeds (which allow the beam chopping rotor to function as a high speed shutter) are linearly related to the underlying web speed and laser power, thus, depending on the burn-through characteristics sought, the rotor may deliver shorter or longer pulses to obtain circular or oval shaped perforations in the web. When the laser is active, but the machine is in "standby" a safety interlock forces the shutter wheel to rotate at a preset minimum speed thereby reducing the risk of laser damage to the rotor.

The logic underlying the programming is as follows. It should be noted that the program is described by way of its intended objects hereinafter, as it is deemed that a programming technician is capable of programming the PLC to perform its logical steps in conjunction with the inputs noted below and the disclosure associated therewith.

When the computer is turned on, it runs through an initialization, booting up its operating system and initializing its associated software. The various sensor links in to the programmable control unit are actuated and initial status readings are taken. These status readings are constantly updated throughout the machine operation.

These continual status readings (including arm location, knife location, laser status, etc.) enable the machine to actuate several concurrently running programs, including its safety interlocks, for preventing accidental or improper operation. For example, the machine cannot be started if the arm is raised and the paper not threaded to the startup spindle. Or, the laser shutter rotor cannot be powered down if the laser is still at full power without wall shutters closing to prevent damage.

A computer control clock setting is also begun to coordinate the various inputs, outputs, and commands onto the display and/or into the computer memory.

The data collected during this initialization include arm location, knife location, rotor speed, laser power, web speed and tension. Changes in the status as a result of operator manipulation are updated to allow for permissive operations. An interlock can optionally be disabled, and a "maintenance mode" can force certain operations despite software commands to the contrary.

At the beginning of a new conversion run, the bobbin length is set to zero, and the speed of the web is calculated and inputted into memory. Usually, at this point the speed is zero.

The laser interlock safety feature is continually active in the software. The software compares the laser output value and determines whether it falls within a preset range, which varies according to laser type, rotor type, size and configuration. The software measures the rotor command to determine its speed. It also measures the laser input to calculate its power output for the beam paths, then calculates a ratio of the laser output to the rotor speed.

Depending on the rotor material, when the laser-rotor speed ratio falls outside a certain value, the interlock is actuated to close wall shutters to cut off the laser beam by diverting it into a nondamageable material.

A table of acceptable values is stored in the PLC; and is calculatable by one of skill in the art having regard for this disclosure. If the ratio is outside the desirable value, an audible or visual alarm will sound. This may occur at any point during machine setup or operation.

The software additionally looks for the pivot arm placement; e.g. is the arm raised or lowered. If the arm is raised, it indicates the machine is unable to begin operation. If the arm is lowered, this indicates to the controller that the operator has placed a new bobbin core on the receiving spindle, and the software concludes there is a new adhesive strip on the swinging arm.

The programming then unlocks the preset condition and allows the operator to tension the paper along the paper path by pressing the preset button which actuates the startup roller in an initial slow speed (crawl speed 1).

The software then looks to sensor input to determine if the web is properly placed in the paper path and under tension. If the tension value is too low, or the sensor indicates no paper in the path, the software will lockout the "go" button and actuate an alarm, enabling the operator to reset the paper in the path or correctly insert and tension the paper.

Additionally, if the web breaks during operation, the machine can shutdown when it senses tension loss or paper out of the path. The software additionally preferentially has a timer which requires a certain minimum slack take time before the machine can be actuated.

Upon actuation of the "go" button, the software senses web speed (it is also concurrently sensing tension, laser power, and rotor speed). It then engages in a perforation calculation to determine the appropriate rotor speed to have the perforations appropriately spaced. Meanwhile, the laser is preferably operating at power with the wall shutters closed to prevent damage to the rotor. This initial slow "crawl" period is timed to bring the paper up to a minimum speed, usually about 8–10% of the machine maximum operating speed.

A timer loop ensures a minimum crawl period occurs before the command to actuate the main drive occurs to clear the paper path of non perforated or converted paper.

The software in the PLC then initializes the routine which will result in the paper being cut precisely at the time where perforations are acceptable. The laser is brought to power, and the takeup roller accelerates the web speed. The rotor is also brought up to speed, which results in the final shutters being automatically opened, preferably by solenoid, once the paper and laser are at a synchronization point for acceptable perforation.

The laser is then perforating the web. The PLC software ensures the takeup bobbin (rewind bobbin) is in the lowered position, and the rewind motor is synchronized to match the speed of the takeup roller as each accelerates. The rotor speed and web speed are controlled such that the ratio of their values, and the laser output, are within preset limits, and executes the adhesive tab insertion.

Milliseconds later, preferably 40 by the internal counter at a speed of 300 feet per minute, the software actuates the knife. The knife is pneumatically driven and solenoid controlled such that it cuts the web at precisely before the tab insertion point. After the knife fires, the software records the firing and issues a command to retract by reverse firing the pneumatic jack. It also optionally fires a pneumatic release pin in the arcuate surface to allow the surface to drop out of the immediate vicinity of the paper path.

The software then allows the takeup roller to spin down, optionally applies a brake, and continues the acceleration of the pinch roller and rewind bobbin up to full speed, in the vicinity of 5000 feet per minute. The rotor speed and web speed are carefully ramped up simultaneously to enable the perforations to be accomplished as the web accelerates from 300 to 5000 feet per minute.

As the bobbin grows on the rewind spindle, the arm is physically retracted on the optional arcuate surface, which is then automatically reset.

To prevent bouncing of the spindle through inertial roughness, the unwind spindle is provided with a tension brake. The PLC software applies a minimum tension to the unwind spindle which also allows the paper to seat firmly in its path.

If the paper breaks, or the bobbin comes to an end, the tension drops to zero, beginning a runout timer, which continues to drive the rewind bobbin for a predetermined period of time to clear the paper path. The unwind spindle brake control is inactivated, and the speed drops to zero while a brake is applied to the spindle until the speed is zero. Once a speed of zero is detected, the spindle is unlocked, and the drive clutch disengaged.

The spindle unlock returns the machine to the manual control of the operator. The operator then manually may raise the pivot arm to lift the bobbin from contact with the pinch roller. The bobbin is then physically removed from the rewind spindle and the machine is ready to be reset. The waste paper is removed from the startup spindle once its rotational speed is approximately zero, which occurs usually sometime during the running of the machine.

Optionally, this apparatus as described above can be operated with the dual track machine described in U.S. Pat. No. 4,346,284, which disclosure is incorporated herein in its entirety.

Other safety features are optionally incorporated into this apparatus. For example, temperature sensors may be provided strategically throughout the apparatus to ensure the rotors, motors, spindles, and other moving parts are not outside a safe operating temperature zone. The software can then show a machine fault and the operator can make a decision to shutdown or wait to the end of the bobbin. Likewise, a faulty startup which resulted in defective product can also be detected and the product quarantined. For example, if the shutters are stuck closed, an alarm may be sounded. If the laser falls below a certain preselected level for the material being perforated, an alarm may be sounded.

Any of the automated functions may be manually overridden to manually perform the perforation function.

FIG. 12 illustrates additional function boxes on the main display screen which enable additional functions to be performed. One of the most preferable functions is the laser function 1210 for calibration. It enables the laser to be fired for a preferably 20 second test pulse into a calibrating device to ensure the output corresponds to the input power. The slope intercept adjustment in the equation y=mx+b discussed above is then adjusted to assure constant output. If the intercept is adjusted by a factor of excessive magnitude, this may indicate a maintenance requirement for the laser or its associated beam optics.

Most commercially available lasers have an output in excess of that necessary for paper or flexible web perforation. Frequently, that means low power accuracy suffers in the ranges optimal for slow speed perforation. Wattages normally suitable for this application are in the vicinity of 75 watts or below.

Modification of commercial lasers should be accomplished in conjunction with the manufacturer to assure safety. In essence, the thermopile diffuser disc is heated at higher temperatures, and it takes a while to cool down. During that time period, laser output may exceed that which is sought. The hardware should be modified to move the zero command offset and watt power monitor zero offset to reflect a true zero. Once these changes are made, the laser can be calibrated.

Calibration starts by setting the calibration equation for the simple y=mx+b equation to a zero correction status. In essence, slope m is set to one and the y intercept b to zero. The laser is then commanded to sequentially produce 20, 50, 80, 300, and 600 watts. The outputs are then measured using an effective probe. The data points may be plotted on a simple watts in-watts out x/y axis plot. An example of a calibration reading chart is shown below:

| n | X Squared | Commanded X | Actual Y | X × Y |
|---|-----------|-------------|----------|-------|
| 1 | 400 | 20 | 0.0 | 0.0 |
| 2 | 2500 | 50 | 28.5 | 1425 |
| 3 | 6400 | 80 | 61.5 | 4920 |
| 4 | 90000 | 300 | 310 | 93000 |
| 5 | 360000 | 600 | 600 | 360000 |
| SUMS | 459300 | 1050 | 1000 | 459345 |
|  | 1102500 | | SQUARED SUM | |

The preferred slope and intercept equation to solve for the values over the measured readings (which reduces linear assumption errors) is:

$$m = \frac{n\sum xy - \sum x \sum y}{n\sum (x^2) - (\sum x)^2}$$

By substituting the values received from the measurements made into the slope and intercept equation, both m and b can be calculated.

After calibration, one can then state that (by way of example for a calculated value): Predicted power= 1.044158×Commanded Power−19.273241 (watts).

This linear regression analysis is verified by examining the r squared valued. R-squared data is an indicator of how well the predicted data corresponds to the actual data.

| Command Power | Actual Power | Predicted | Difference | Squared Difference | (Actual - Average)$^2$ |
|---|---|---|---|---|---|
| 20 | 0.0 | 1.609924623 | −1.6 | 2.591857292 | 40000.0 |
| 50 | 28.5 | 32.93467337 | −4.4 | 19.66632787 | 29412.3 |
| 80 | 61.5 | 64.25942211 | −2.8 | 7.614410384 | 19182.3 |
| 300 | 310 | 293.9742462 | 16.0 | 256.8247839 | 12100.0 |
| 600 | 600 | 607.2217337 | −7.2 | 52.15343718 | 160000.0 |
|  | 200 Average |  |  | 338.8508166 ssresid | 260694.5 sstotal |
|  |  |  |  | 0.9987002 $r^2$ | 260355.6 ssreg |

The command power represents the laser's commanded value setpoints in watts. The actual column contains the measured watt values. The predicted column contains numbers generated by the slope and y intercept from the method of least squares regression analysis. The difference column contains the differences between the actual and predicted values, while the next column is the squared value. The final column is the actual value minus the actual average (seen at bottom of second column), squared. The r-squared value is obtained by subtracting the quotient of the residual sum of squares value (dividend) over the total sum of squares value (divisor) from the value 1.0. In this case, 0.9987002.

Having established the linear relationship between commanded and predicted power, back calculated power may let us determine the laser power setting knowing what the predicted outcome is.

For example, if an output of 250 watts is sought:

$$y = mx + b$$

$$x = \frac{y - b}{m}$$

$$x = \frac{y - (-19.273241)}{1.044158}$$

$$x = \frac{250 - (-19.273241)}{1.044158} = 257.9$$

Thus, a commanded laser power setting of 257.9 should result in an output of about 250 watts, with minor errors from the underlying linear trendline assumption.

These calculated values assist in correcting over perforation defects. For example, if the pressure drop in the early portions of laser perforation ramp up process is too high, this can be corrected. By way of information, a high pressure drop indicates that the lasers are not delivering enough throughput to perforate sufficiently.

FIG. 14 is a graph of the pressure drop in centimeters of water (y axis) versus the percent distance from the bobbin core to interruption of the paper path (x axis). The dotted lines represent a zone of acceptable values for a selected product characteristic. As can be seen, the web does not even enter spec until about 20% of the bobbin width is expended. It does not reliably remain within specification until point B, which is about 50% of the bobbin diameter. Since the radius is constantly increasing but overall length is exponential to this, this represents a minor portion of the paper (less than ¼ of the overall meterage), but a substantial quantity nonetheless.

In order to compensate for the laser weakness, a new slope intercept laser equation will be biased to increase the laser power during the weak portion of the perforation process.

The slope intercept equation shows this mathematically:

y=mx+b y=m'x+b' m'=m+n and b'=b−c

The value of c is the bias value and will be selected by mathematical operations such that the core of the bobbin, where the out of specification web usually resides, is in specification.

Since the value of b is already known, b' is calculated as follows:

$$b'=b-c$$

b'=−19.273241−100=−119.27324

Selecting a bias of 100 is illustrated in FIG. 15, wherein the x axis is input power and the y axis is desired output power. In that figure, we have selected a power which gives acceptable perforation in both the unbiased equation and the biased equation at full speed—essentially correcting for the defective portion of the product. That point is called the anchor point.

Decreasing the y intercept while maintaining the anchor point constant causes a change in the slope of the line which corrects for the out of spec first portion. To sum—the biased slope intercept induces the laser to generate appropriate product during the entire portion of the ramping process. If the pressure drop is too low, a negative bias will be entered to lower laser power.

FIG. 16 illustrates a sample wherein the light dots have been corrected by a bias. The corrected bias remains within spec. Again, the graph illustrates pressure drop on the y axis versus percentage across the bobbin radius. The waste spindle (FIG. 3, reference numeral 300) provides an excellent source of paper to doublecheck the amount and quality of waste paper. Perforation tests may be run upon the paper ont he spindle to determine its level of perforation, and the deduced slope intercept may be biased intuitively, bringing the perforated paper of FIG. 14 into line with the light dots of FIG. 16. These calibration steps can occur while the product is running through the converting apparatus, or while it is offline.

Other modifications and improvements and equivalent structures for accomplishing the objects of the present invention will now be apparent to one of skill in the art having regard for this disclosure.

We claim:

1. An apparatus for collecting strip material produced from the conversion of a flexible web of the strip material supplied in a bobbin, the apparatus comprising:

a first spindle for accepting at least one bobbin of an unconverted flexible web of strip paper material, said first spindle being mounted for of angular rotation, a second spindle for receiving a portion of the strip material of the at least one bobbin of strip material after it has been converted, said second spindle providing powered angular rotation and being displaceable in a path, a third spindle for receiving waste strip material produced during the conversion of the strip material, said third spindle providing powered angular rotation and being located proximate to said second spindle, a pathway for the strip material between said first spindle and said third spindle, said pathway for the strip material intersecting at least tangentially the path of displacement of said second spindle, a variable converter located along the pathway, said convertor being adapted to perform a conversion function at different rates to produce a converted flexible material, an adhesive tab applicator arm located immediately upstream of the second spindle and being configured to insert an adhesive tab between the second spindle and the converted flexible material, a cutting knife for cutting the waste portion of the web from the converted portion of the web, a control device for operating the apparatus, said control device being a computing device which controls the angular rotation of each spindle, the variable converter, the adhesive tab applicator arm, and the cutting knife, in response to sensor input and control output; whereby, during operation a first portion of the flexible material from the at least one bobbin is fed to the third spindle through the pathway at an accelerating speed, the converter is actuated to a preselected effective rate, the control device actuates the adhesive tab applicator arm to insert an adhesive tab between the paper and the second spindle after the point where the preselected conversion level is reached, after the adhesive tab is inserted, the control device actuates the knife to cut the flexible web at or immediately before the adhesive tab to sever waste flexible material from converted flexible material, and the second spindle and the converter are concurrently thereafter controlled to give a conversion rate at the preselected level for the duration of the conversion of the bobbin to yield a bobbin of converted flexible material on said second spindle and a length of waste material on said third spindle.

2. An apparatus as claimed in claim 1, wherein the second spindle, third spindle, and knife are mounted on a pivotable arm, whereby said second spindle and knife may be brought into proximity with the paper pathway.

3. An apparatus as claimed in claim 2, wherein the knife is mounted so as to be free to pivot about a point, and that pivoting motion of the knife is guided by an arcuate surface disposed below the knife.

4. An apparatus as claimed in claim 3, wherein the pivotable arm is disposed above the paper pathway, the knife pivots about the third spindle, and the guiding arcuate surface is below the paper pathway, whereby when the pivotable arm is pivotally lowered the knife engages the arcuate surface and is driven to a position proximate to the paper pathway.

5. An apparatus as claimed in claim 1, wherein each of the spindles has a distal end and comprises at least two arcuate surface components and a circular inner spacer, said arcuate surface components having at least one angled internal surface concentric to the spindle, and said spacer having a correspondingly angled external surface concentric to the spindle, said at least two arcuate components being normally biased such that the at least one internal angled surface engages the spacer external angled surface and is driven outwardly, whereupon when a displacement force perpendicular to the plane of rotation of the spindle is applied toward the distal end of the spindle, the at least one internal angled surface of the surface components is adapted to move relative to the external angled surface of the inner spacer, and the surface components are thereby displaced inwardly to the spindle axis.

6. An apparatus as claimed in claim 1, wherein the third spindle comprises at least two arcuate surface components and a circular inner spacer, said arcuate surface components having at least one internal angled surface concentric to the spindle, and said spacer having a corresponding external angled surface concentric to the spindle, said at least two arcuate members being spring biased such that the at least one internal angled surface engages the spacer external angled surface and is driven outwardly, whereupon when a displacement force perpendicular to the plane of rotation of the spindle is applied towards the distal end of the spindle, the at least one internal angled surface of the surface components is adapted to move relative to the external angled surface of the inner spacer and the surface components are displaced inwardly towards the spindle axis.

7. An apparatus as claimed in claim 1, wherein the converter is a software controllable variable power laser paper perforator.

8. An apparatus as claimed in claim 7, wherein the laser perforator beam of the perforator is gated by a rotating beam chopping wheel containing apertures for said beam to pass through.

9. An apparatus as claimed in claim 8, wherein the control device comprises a software program encoding at least the following logical steps:

i) receive a flexible web material speed value input, and a laser power value input, ii) compare the ratio of the values of the received inputs to an internal lookup table of ratio values, iii) if the ratio falls within a selected range, send a command signal to the adhesive tab applicator arm to insert an adhesive tab;

iv) after sending the adhesive tab insert signal, wait a preselected delay period;

v) at the expiration of the preselected delay period, send a signal to actuate the knife.

10. A apparatus as claimed in claim 9, wherein the logical steps programmed into the control device further comprise the steps of:

vi) receive tension value inputs vii) when the tension value drops below a preselected level, activate a timer to measure a sufficient delay to clear the paper pathway, viii) when the delay time is reached, shutdown the powered angular rotation of the second spindle.

11. An apparatus as claimed in claim 1, wherein said third spindle is provided with a slot therein extending through the spindle in the direction of the axis of rotation.

12. An apparatus for collecting strip paper material produced from the laser perforation of a flexible web of strip paper material supplied in bobbin form, the apparatus comprising:

a first spindle for accepting at least one bobbin of an unconverted flexible web of strip paper material, said first spindle being mounted for angular rotation and being provided with a brake, said first spindle being at the beginning of a paper pathway, a second spindle for receiving the major portion of the strip material of the at least one bobbin of strip material after it has been converted, said second spindle providing powered angular rotation and said second spindle being mounted on a pivotable arm and being displaceable in an arcuate path which intersects the paper pathway, a third spindle for receiving waste strip material produced during the conversion of the strip material, said third spindle providing powered angular rotation and being located proximate to said second spindle at the end of the paper pathway, said third spindle further comprising a slot therein extending through the third spindle in the direction of the axis of rotation, a variable power laser perforator located along the pathway, said perforator generating a laser beam directed into said paper pathway, and further comprising a shutter for chopping the laser beam into discrete pulses, an adhesive tab applicator arm located immediately upstream of the second spindle and being configured to insert an adhesive tab between the second spindle and the converted flexible material, a cutting knife for cutting the waste portion of the web from the converted portion of the web, and a control device for operating the machine, said control device being a computing device which is provided with software programming which controls the angular rotation of each spindle, the speed of the paper web/ the power and pulse duration of the laser, the brake, the adhesive tab applicator arm, and the cutting knife; whereby the apparatus is configured to feed a first portion of the flexible material from the at least one bobbin to the third spindle through the pathway at an accelerating speed, provide power to the laser perforator in sufficient amount to perforate the web at a determined speed, actuate the adhesive tab applicator arm to insert an adhesive tab between the paper and the second spindle after the point where a preselected conversion level is reached, actuate the knife to cut the flexible web at or immediately before the adhesive tab to sever waste flexible material from converted flexible material, accelerate the second spindle at rates selected by the control device to give a conversion rate at the preselected level for the duration of the conversion of the bobbin to yield a bobbin of converted flexible material on said second spindle and a minor length of waste material on said third spindle.

13. An apparatus as claimed in claim 12, wherein the pivotable arm is disposed above the paper pathway, the third spindle is positioned on the pivotable arm, the knife is mounted to pivot about the third spindle, and a guiding arcuate surface is below the paper pathway, whereby when the pivotable arm is lowered the knife engages the arcuate surface and is driven to a position proximate to the paper pathway.

14. An apparatus as claimed in claim 12, wherein each of the spindles comprises at least two arcuate surface components and a circular inner spacer, said arcuate surface components having at least one angled internal surface concentric to the spindle, and said spacer having a correspondingly angled external surface concentric to the spindle, said at least two arcuate components being normally spring biased such that the at least one internal angled surface engages the spacer external angled surface and is driven outwardly, whereupon when a displacement force perpendicular to the plane of rotation of the spindle is applied in the direction of a distal end of the spindle, the at least one internal angled surface of the surface components is adapted to move relative to the external angled surface of the inner spacer and the surface components are displaced inwardly to the spindle axis.

15. An apparatus as claimed in claim 12, wherein the third spindle comprises at least two arcuate surface components and a circular inner spacer, said arcuate surface components having at least one angled internal surface concentric to the spindle, and said spacer having a correspondingly angled external surface concentric to the spindle, said at least two arcuate members being normally spring biased such that the at least one internal angled surface engages the spacer external angled surface and is driven outwardly, whereupon when a displacement force perpendicular to the plane of rotation of the spindle is applied in the direction of a distal end of the spindle, the at least one internal angled surface of the surface components is adapted to move relative to the external angled surface of the inner spacer and the surface components are displaced inwardly towards the spindle axis.

* * * * *